United States Patent [19]
Schafer et al.

[11] Patent Number: 6,065,100
[45] Date of Patent: May 16, 2000

[54] CACHING APPARATUS AND METHOD FOR ENHANCING RETRIEVAL OF DATA FROM AN OPTICAL STORAGE DEVICE

[75] Inventors: Bruce W. Schafer, Aloha; Jeffrey W. Teeters; Mark C. Chweh, both of Beaverton; David A. Lee, Aloha; Daniel P. O'Connell, Alsea; Gowri Ramanathan, Beaverton, all of Oreg.

[73] Assignee: Micro-Design International, Winter Park, Fla.

[21] Appl. No.: 08/746,628

[22] Filed: Nov. 12, 1996

[51] Int. Cl.[7] ............................................ G06F 12/08
[52] U.S. Cl. .................... 711/137; 711/204; 711/213; 712/207; 712/237; 712/239
[58] Field of Search ................................ 711/113, 118, 711/137, 140, 213; 712/207, 237, 239

[56] References Cited

U.S. PATENT DOCUMENTS

| | | | |
|---|---|---|---|
| 4,371,927 | 2/1983 | Wilhite et al. ........................... | 711/137 |
| 4,371,929 | 2/1983 | Brann et al. .............................. | 710/45 |
| 4,399,503 | 8/1983 | Hawley .................................... | 711/113 |
| 4,437,155 | 3/1984 | Sawyer et al. ........................... | 711/136 |
| 4,466,059 | 8/1984 | Bastian et al. ........................... | 711/122 |

(List continued on next page.)

OTHER PUBLICATIONS

Callahan, et al., "Software Prefetching", pp. 40–52, 1991.
Klaiber, et al., "An Architecture for Software–Controlled Data Pretching", University of Washington, pp. 43–53, 1991.
Mowry, et al., "Tolerating Latency Through Software–Controlled Prefetching in Shared–Memory Multiprocessors", pp. 87–106, 1991.
"Super PC–Kwick abd PC–Kwik RAM Disk User's Guide and Addendum" PC–Kwik Corporation, 1992–1993.
"Disk Reads with DRAM Latency" Garth A Gibson, R. Hugo Patterson, M. Satyanarayanan, Apr. 1992.
"A File–Based Adaptive Prefetch Caching Design", F. Warren Smith, Tze–Chiange Lee, Shauchi Ong, 1990.
"Caching Strategies to Improve Disk System Performance" Ramakrishna Karedla, Digital Equipment Corporation, J. Spencer Love, Independant Consultant, Bradeley G. Wherry, McREL Corporation,, 1994.
acm Transactions on Computer Systems, "Disk Cache–Miss Ratio Analysis and Design Considerations", Alan Jay Smith, Aug. 1985.

(List continued on next page.)

Primary Examiner—Hiep T. Nguyen
Attorney, Agent, or Firm—Allen, Dyer, Doppelt, Milbrath & Gilchrist, P.A.

[57] ABSTRACT

A caching apparatus and method for enhancing retrieval of data from an optical storage device are provided. The apparatus preferably includes a first memory device for storing data therein. The first memory device preferably includes a predetermined application. An optical storage device is positioned in communication with the first memory device for optically storing data therein. The optical storage device includes a plurality of data storage sectors. A second memory device is positioned in communication with the first memory device for storing data. The second memory device preferably has a predetermined amount of data storage space. The predetermined amount of data storage space includes a caching space defined by only a portion of the predetermined amount of data storage space of the second memory device. A caching engine is positioned in communication with the first memory device, the second memory device, and the optical storage device for temporarily storing data from the data storage sectors in the caching space and thereby providing a quick transfer of the data to the first memory device for use by the predetermined application. An event script is provided positioned in communication with the caching engine to direct the caching engine to transfer data sectors from the optical data storage device to the caching space in advance of being actually needed for the predetermined application of the first memory device.

42 Claims, 21 Drawing Sheets

U.S. PATENT DOCUMENTS

| | | | |
|---|---|---|---|
| 4,476,526 | 10/1984 | Dodd | 711/113 |
| 4,489,378 | 12/1984 | Dixon et al. | 710/33 |
| 4,490,782 | 12/1984 | Dixon et al. | 711/136 |
| 4,536,836 | 8/1985 | Dodd et al. | 711/113 |
| 4,571,674 | 2/1986 | Hartung | 711/160 |
| 4,723,223 | 2/1988 | Hanada | 710/26 |
| 4,780,808 | 10/1988 | Moreno et al. | 711/4 |
| 4,792,917 | 12/1988 | Takamatsu et al. | 710/21 |
| 4,800,483 | 1/1989 | Yamamoto et al. | 710/126 |
| 4,819,203 | 4/1989 | Shiroyanagi et al. | 711/113 |
| 4,849,929 | 7/1989 | Timsit | 714/5 |
| 4,860,192 | 8/1989 | Sachs et al. | 711/3 |
| 4,870,565 | 9/1989 | Yamamoto et al. | 711/113 |
| 4,882,642 | 11/1989 | Tayler et al. | 360/78.11 |
| 4,947,319 | 8/1990 | Bozman | 711/118 |
| 4,956,803 | 9/1990 | Tayler et al. | 711/113 |
| 4,972,316 | 11/1990 | Dixon et al. | 711/113 |
| 4,972,364 | 11/1990 | Barrett et al. | 711/117 |
| 4,974,156 | 11/1990 | Harding et al. | 711/162 |
| 4,980,823 | 12/1990 | Liu | 711/136 |
| 5,043,885 | 8/1991 | Robinson | 711/133 |
| 5,131,612 | 7/1992 | Satoh et al. | 246/107 |
| 5,134,563 | 7/1992 | Tayler et al. | 711/146 |
| 5,142,670 | 8/1992 | Stone et al. | 711/133 |
| 5,146,578 | 9/1992 | Zangenehpour | 711/137 |
| 5,150,472 | 9/1992 | Blank et al. | 711/137 |
| 5,224,217 | 6/1993 | Zangenehpour | 711/136 |
| 5,226,141 | 7/1993 | Esbensen | 711/171 |
| 5,257,370 | 10/1993 | Letwin | 711/113 |
| 5,261,072 | 11/1993 | Seigel | 710/22 |
| 5,263,142 | 11/1993 | Watkins et al. | 710/22 |
| 5,265,254 | 11/1993 | Blasciak et al. | 395/704 |
| 5,269,019 | 12/1993 | Peterson et al. | 707/205 |
| 5,276,835 | 1/1994 | Mohan et al. | 711/114 |
| 5,276,840 | 1/1994 | Yu | 710/35 |
| 5,289,581 | 2/1994 | Berenguel et al. | 711/113 |
| 5,291,189 | 3/1994 | Otake et al. | 345/200 |
| 5,293,609 | 3/1994 | Shih et al. | 711/137 |
| 5,305,389 | 4/1994 | Palmer | 382/305 |
| 5,309,451 | 5/1994 | Noya et al. | 714/766 |
| 5,317,713 | 5/1994 | Glassburn | 711/113 |
| 5,325,509 | 6/1994 | Lautzenheisery | 711/137 |
| 5,337,197 | 8/1994 | Brown et al. | 360/48 |
| 5,347,640 | 9/1994 | You | 711/4 |
| 5,347,642 | 9/1994 | Barratt | 711/131 |
| 5,353,410 | 10/1994 | Macon, Jr. et al. | 711/144 |
| 5,353,426 | 10/1994 | Patel et al. | 711/118 |
| 5,353,430 | 10/1994 | Lautzenheiser | 711/117 |
| 5,355,453 | 10/1994 | Row et al. | 709/219 |
| 5,357,618 | 10/1994 | Mirza et al. | 711/217 |
| 5,357,623 | 10/1994 | Megory-Cohen | 711/129 |
| 5,359,611 | 10/1994 | Parks et al. | 714/766 |
| 5,369,751 | 11/1994 | Kambayashi et al. | 710/74 |
| 5,371,855 | 12/1994 | Idleman et al. | 711/113 |
| 5,377,329 | 12/1994 | Seitz | 710/54 |
| 5,381,539 | 1/1995 | Yanai et al. | 711/133 |
| 5,390,318 | 2/1995 | Ramakrishnan et al. | 711/158 |
| 5,392,413 | 2/1995 | Nomura et al. | 711/113 |
| 5,392,445 | 2/1995 | Takamoto et al. | 711/114 |
| 5,410,653 | 4/1995 | Macon, Jr. et al. | 711/137 |
| 5,418,910 | 5/1995 | Siegel | 710/52 |
| 5,418,921 | 5/1995 | Cortney et al. | 711/114 |
| 5,418,922 | 5/1995 | Liu | 711/3 |
| 5,418,927 | 5/1995 | Chang et al. | 711/163 |
| 5,422,771 | 6/1995 | Filepp et al. | 360/108 |
| 5,450,586 | 9/1995 | Kuzara et al. | 395/704 |
| 5,452,440 | 9/1995 | Salsburg | 711/136 |
| 5,452,447 | 9/1995 | Nelson et al. | 707/205 |
| 5,457,796 | 10/1995 | Thompson | 707/203 |
| 5,465,350 | 11/1995 | Fueki | 707/204 |
| 5,475,859 | 12/1995 | Kamabayashi et al. | 710/5 |
| 5,491,810 | 2/1996 | Allen | 711/117 |
| 5,495,457 | 2/1996 | Takagi | 369/30 |
| 5,513,336 | 4/1996 | Vishlitzky | 711/136 |
| 5,550,998 | 8/1996 | Willis et al. | 711/114 |
| 5,588,128 | 12/1996 | Hicok et al. | 711/207 |
| 5,668,959 | 9/1997 | Malcolm | 345/333 |
| 5,704,053 | 12/1997 | Santhanam | 712/207 |
| 5,778,435 | 7/1998 | Berenbaum et al. | 711/137 |
| 5,796,971 | 8/1998 | Emberson | 712/207 |
| 5,838,945 | 11/1998 | Emberson | 712/200 |
| 5,925,100 | 7/1999 | Drewry et al. | 709/219 |

OTHER PUBLICATIONS

"Highlight: Using a Log–structured File System for Teriary Storage Management", John T. Kohl, Carl Staelin and Michael Stonebraker, Jan. 25–29, 1993.

"Optimal Partitioning of Cache Memory", Harold Stone, John Turek and Joel L. Wolf, 1992.

"Improving Disk Cache Hit–Ratios Through Cache Partitioning" Dominique Thiebaut, Harold S. Stone and Joel L. Wolf, 1992.

"Modeling Live and Dead Lines in Cache Memory Systems" Abraham Mendelson, Dominique Thiebaut, Dhiraj K. Pradhan, 1993.

"VM/XA SP2 minidisk cache", G.P. Bozman, 1989.

"Optimal Partitioning of Cache Memory", Harold S. Stone, John Turek and Joel L. Wolff, 1992.

"Improving Disk Cache Hit–Ratios Through Cache Partitioning", Dominique Thiebaut, Harold S. Stone and Joel L. Wolff, 1992.

"A Comparative Analysis of Disk Scheduling Policies", Toby J. Teorey and Tad B. Pinkerton, 1972.

"A Continuum of Disk Scheduling Algorithms", Robert Geist, Stephen Daniel, 1987.

"Properties of disk scheduling policies in multiprogrammed computer systems", Toby J. Teorey, 1972.

"Winchesters for multiuser/mulittask applications", by Larry Jacob, 1983.

"A New Approach to Optimal Cache Scheduling", Carsten Vogt.

"I/O Issues in a Multimedia System", A.L. Narasimha Reddy and James C. Wyllie, Mar. 1994.

Fracture Nature of Software–Cache Interation, J. Voldman, B. Mandelbrot, L.W. Hoevel, J. Knight, P. Rosenfeld, Mar. 1983.

Computer Retail Week, "d–Time", 1994–1995.

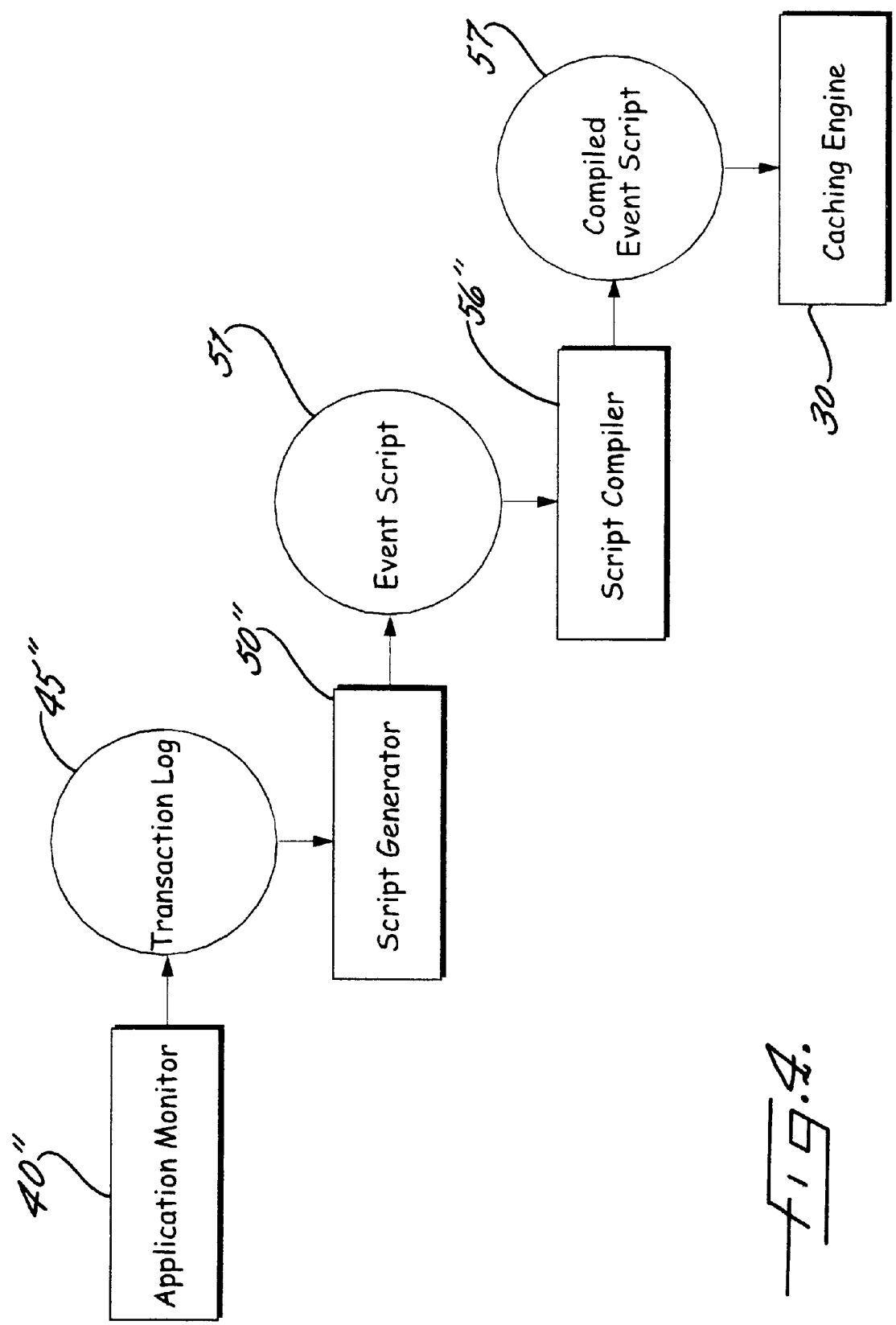

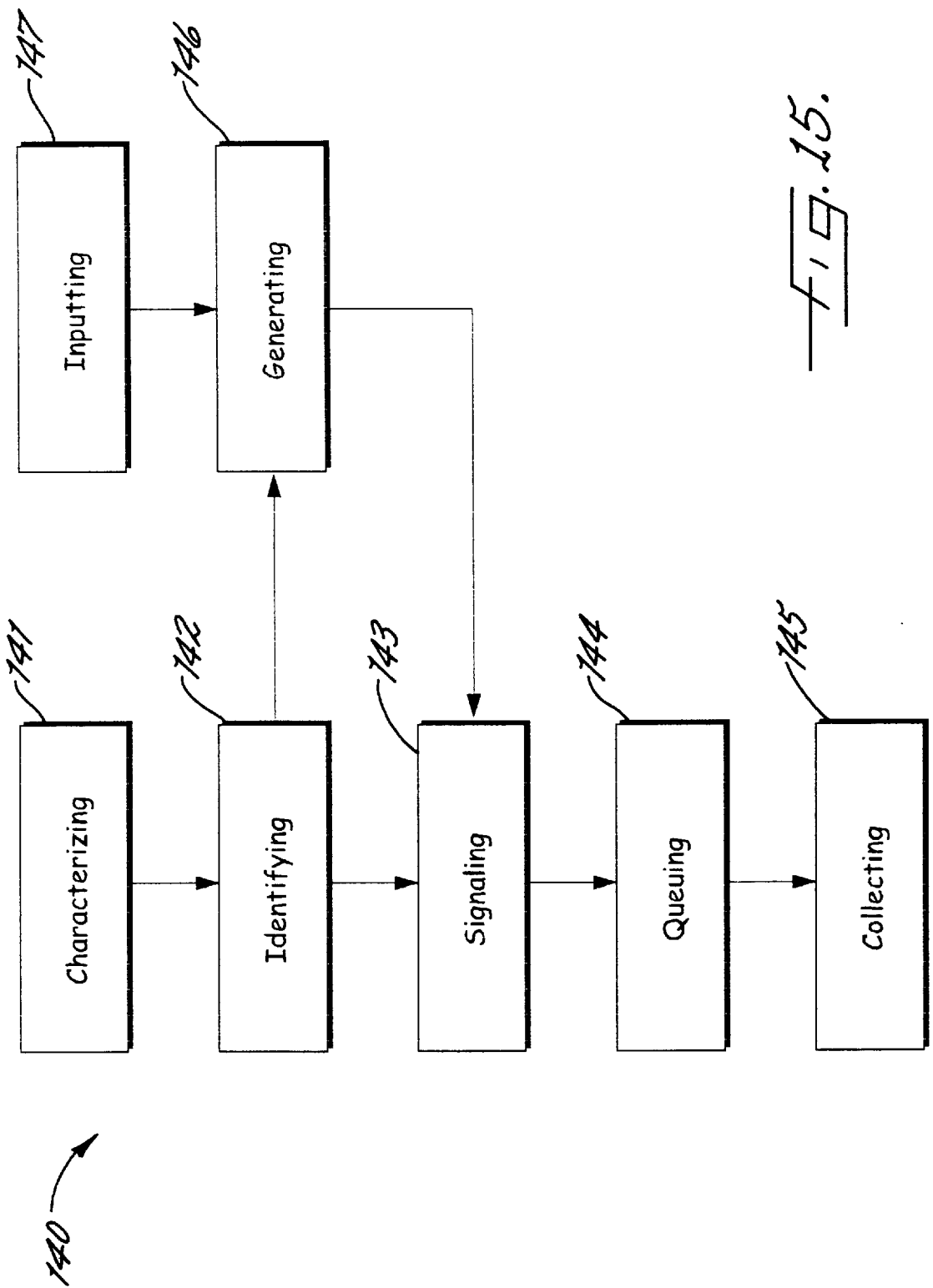

CACHING APPARATUS AND METHOD FOR ENHANCING RETRIEVAL OF DATA FROM AN OPTICAL STORAGE DEVICE

FIELD OF THE INVENTION

The present invention relates to the field of computers and, more particularly, hardware and software data storage for the computer industry.

BACKGROUND OF THE INVENTION

Over the years, the computer hardware and software industries have become highly developed. With the sophistication of the hardware-based systems, software-based systems have advanced rapidly. So much so that software demands and software application programs tend to drive or push hardware advancements now. Examples of software application programs include accounting or tax software programs, database or file management software programs, interactive computer game programs, industrial design programs, document retrieval programs, and inventory control programs. Numerous other types of application programs for various industries, however, also exist and can be and continue to be developed.

A conventional computer or computer system now generally includes at least one main or central processing unit ("CPU"), at least one random access memory ("RAM") connected to the CPU, at least one optical storage device (e.g., a compact-disk read-only-memory ("CD-ROM")) positioned in communication with the RAM, and a hard disk drive positioned in communication with the RAM. The CD-ROMs of computer systems have been developed to beneficially store large amounts of data which is often needed for sophisticated software application programs. Because CD-ROMs are traditionally slow when the CPU of a computer system attempts to read even portions of the large amount of data stored in the CD-ROM, various caching processes which attempt to speed up the retrieval of data from the CD-ROM have been developed over the years.

A caching space is simply a smaller area, often a much smaller area, of data storage in a memory that can be retrieved at a much faster speed to the RAM than directly from a CD-ROM or other types of slower memory. The caching space has retrieved and stored data (e.g., conventionally highly used data) in anticipation of what will be needed by a software application or the end user. The caching for rotating data storage media such as a CD-ROM is conventionally a software or firmware application. The caching for conventional memory, on the other hand, usually involves electronic circuitry or hardware solutions.

As an example, enhancing retrieval speeds from CD-ROMs is of particular interest to software application developers. These developers often develop software applications that require extensive use of software or data stored in CD-ROM. These software developers, however, continue to look for and need ways to more effectively use and handle the large amount of data often needed or desired from optical storage devices.

An example of a caching system is described in U.S. Pat. No. 5,305,389 by Palmer titled *"Predictive Cache System."* This patent describes a caching system that learns to "fetch" data. Patterns of access to data objects are stored in cache memory. The stored patterns are generated by analysis of prior object accesses when the data processing system was processing in a like context. The prediction of which data objects to fetch from a secondary memory is based upon the order of stored patterns of previous accesses. Although this may be beneficial over some prior caching systems, a predictive pattern-type cache system based upon this type of ordering scheme falls short in an attempt to substantially assist software application developers in maximizing or optimizing speed and storage space constraints of the particular software application program which is being developed.

SUMMARY OF THE INVENTION

With the foregoing in mind, the present invention advantageously provides a caching apparatus and method for enhancing retrieval of data from an optical storage device that substantially assists software application developers and application program users in maximizing speed and balancing storage space constraints of a particular software application program which is being or has been developed. For example, these developers often develop software applications that require extensive use of software or data stored in optical data storage devices. By providing a caching apparatus that performs as a part of the developer's software sent to the end user, or as part of the end user's software, the end user's data use and data retrieval speed are greatly enhanced without requiring user intervention.

A caching apparatus according to the present invention advantageously provides an event script to direct a caching engine to transfer data sectors from an optical data storage device such as a CD-ROM device to a caching space in advance of being actually needed for a predetermined application. The event script preferably is a set of instructions for a caching engine of the apparatus which has a goal of maximizing or optimizing speed and balancing storage space constraints of a software application program. By providing an event script instead of prefetching data based upon previous access patterns, the caching apparatus can advantageously take into account overall goals of the caching process of each software application developer to substantially increase retrieval of data from a storage device such as a CD-ROM which is otherwise conventionally slow in retrieving data therefrom, e.g., as much as two times faster than some other known caching solutions.

More particularly, a caching apparatus for enhancing retrieval of data from an optical storage device is advantageously provided according to the present invention and preferably includes a first memory device for storing data therein. The first memory device preferably includes a predetermined application. An optical storage device is positioned in communication with the first memory device for optically storing data therein. The optical storage device includes a plurality of data storage sectors. A second memory device is positioned in communication with the first memory device for storing data. The second memory device preferably has a predetermined amount of data storage space. The predetermined amount of data storage space includes a caching space defined by only a portion of the predetermined amount of data storage space of the second memory device. A caching engine is positioned in communication with the first memory device, the second memory device, and the optical storage device for temporarily storing data from the data storage sectors in the caching space and thereby providing a quick transfer of the data to the first memory device for use by the predetermined application. Event script providing means is positioned in communication with the second memory device for providing an event script to direct the caching engine to transfer data sectors from the optical data storage device to the caching space in advance of being actually needed for the predetermined application of the first memory device.

A caching apparatus for enhancing retrieval of data from an optical storage device according to another aspect of the present invention preferably further includes a user interface and processing means responsive to the user interface for processing data. The first memory device is preferably a random access memory responsive to the processing means for storing data. The second memory device is preferably a hard disk drive positioned in communication with the random access memory for storing data from the optical storage device. The hard disk drive has a predetermined amount of data storage space. The predetermined amount of data storage space preferably includes cache data storage means defined by only a portion of the predetermined amount of data storage space of the hard disk drive for temporarily storing data responsive to the random access memory and for quickly transferring data to the random access memory. The caching engine is preferably positioned responsive to the processing means for determining when data requested from the optical storage device is stored in the caching data storage means and transferring the requested data from the caching data storage means of the hard disk drive rather than from the optical storage device thereby increasing the speed in which the requested data is delivered to the random access memory. The apparatus preferably further has optical storage access monitoring means responsive to the processing means for monitoring data representative of access to the optical storage device for a predetermined application. Script generating means is preferably positioned responsive to the optical storage access monitoring means and positioned in communication with the caching engine for analyzing the monitored access data and generating an event script from the monitored access data that directs the caching engine to transfer sectors of data from the optical data storage device to the cache data storage means of the hard disk drive in advance of being actually needed for the predetermined application.

A caching apparatus according to this aspect of the present invention, for example, can also advantageously include user modifying means responsive to the processing means for modifying a generated event script. The user input means is also positioned in communication with the script generating means for inputting predetermined event script parameters from a user for a generated event script. These modifying means and user input means can thereby advantageously allow the software developer or other technician, for example, to interactively provide parameter data that would modify, enhance, and/or customize the generated event script for a particular application program.

The present invention also advantageously provides a network type configuration of a caching apparatus for enhancing retrieval of data from an optical storage device. A caching apparatus according to a second embodiment of the present invention preferably includes a user interface, a first processor responsive to the user interface for processing data, and a first memory device responsive to the first processor for storing data. A caching engine is preferably positioned responsive to the first processor for transferring sectors of data. A second processor preferably is provided for processing data, and a second memory device is positioned responsive to the second processor and positioned in communication with the first memory device for storing data. At least one optical storage device is positioned responsive to the second processor and positioned in communication with the second memory device for optically storing data therein. The at least one optical storage device includes a plurality of data storage sectors. A third memory device is positioned in communication with the first memory device for storing data transferred from the second memory device and the at least one optical storage device and from the first memory device positioned in communication with the second memory device. The third memory device has a predetermined amount of data storage space which includes a caching space defined by only a portion of the predetermined amount of data storage space of the third memory device for temporarily storing data from the at least one optical storage device and for quickly transferring data to the first memory device. An optical storage access monitor is positioned responsive to the first processor for monitoring data representative of data transfers from the optical storage device and to the second memory device and from the second memory device to the first memory device for a predetermined application. A script generator preferably is positioned responsive to the optical storage access monitor and positioned in communication with the caching engine for analyzing the monitored access data and generating an event script from the analyzed access data that directs the caching engine to transfer data sectors from the optical data storage device to the caching space of the third memory device in advance of being actually needed for the predetermined application.

Methods of enhancing the retrieval speed of data from a storage device are also provided according to the present invention. One method preferably includes monitoring data representative of access to an optical storage device for a predetermined application and analyzing the monitored access data. An event script is generated for a caching engine responsive to the analyzed access data, and the caching engine instructs which sectors to transfer from an optical storage device in advance of being actually needed responsive to the event script.

Another method of enhancing the retrieval speed of data from an optical storage device according to the present invention preferably includes analyzing a predetermined application program and generating an event script responsive to the analyzed predetermined application program. Data from a first data storage device is then transferred to a second data storage device in advance of actually being needed by the second data storage device responsive to the generated event script.

A further method of enhancing the retrieval speed of data from an optical storage device according to the present invention preferably includes characterizing file data accessed from an optical storage device and identifying the characterized file data. An event is signaled which represents an event associated with an application program. A request for a collection of characterized file data is queued from the optical storage device responsive to the signaled event, and the characterized file data is asynchronously collected from data sectors of the optical storage device in advance of actually being needed.

Because a caching apparatus and methods according to the present invention advantageously monitors access data from a predetermined application or a software application program being developed when the application accesses the optical storage device, for example, this data can then be used to determine what selection of data from the predetermined application can best provide a faster and more efficient way, when the application is being run on a computer either locally or remotely, in the form of an event script which instructs the caching engine to retrieve data from the optical storage device through the random access memory and temporarily position the retrieved data in the caching space of a hard disk drive. This retrieved data in the caching space of the hard disk drive can then quickly transfer desired data to the random access memory when the application is being run on the computer. Because the caching space forms a part of the storage space of a hard disk drive, the data temporarily stored in the caching space advantageously is stored as nonvolatile data so that data can be retained from one session to another separate session of a user's interaction with an application. When frequently used data, for example, is retained between sessions, an application advantageously will often operate or run even faster in subsequent sessions.

This type of analysis and generation of an event script by a caching apparatus according to the present invention significantly assists software application developers in maximizing or optimizing speed and balancing storage space constraints of a particular software application program which is being developed and thereby allows the software application developer to provide additional features to an application program, to store and more readily use additional data in an optical storage device, and to develop more complex and creative application programs. By optimally selecting and caching data from an application program stored in an optical storage device, for example, a caching apparatus according to the present invention can advantageously provide a performance boost to a user even the first time data from an optical storage device is accessed. A caching apparatus and method according to the present invention thereby advantageously provides additional incentives and impetus to software developers to provide additional types, increased functional features, and increased user interaction aspects to software application programs for users of computer systems.

BRIEF DESCRIPTION OF THE DRAWINGS

Some of the features, advantages, and benefits of the present invention have been stated above. Others, however, also will become apparent as the description proceeds when taken in conjunction with the accompanying drawings in which:

FIG. 4 is a schematic view of an application monitor, a script generator, a script compiler, and a caching engine of a caching apparatus according to the present invention;

FIG. 15 is a schematic view of a method of enhancing retrieval of data from a storage device according to yet another aspect of the present invention.

DETAILED DESCRIPTION

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Figure 1:
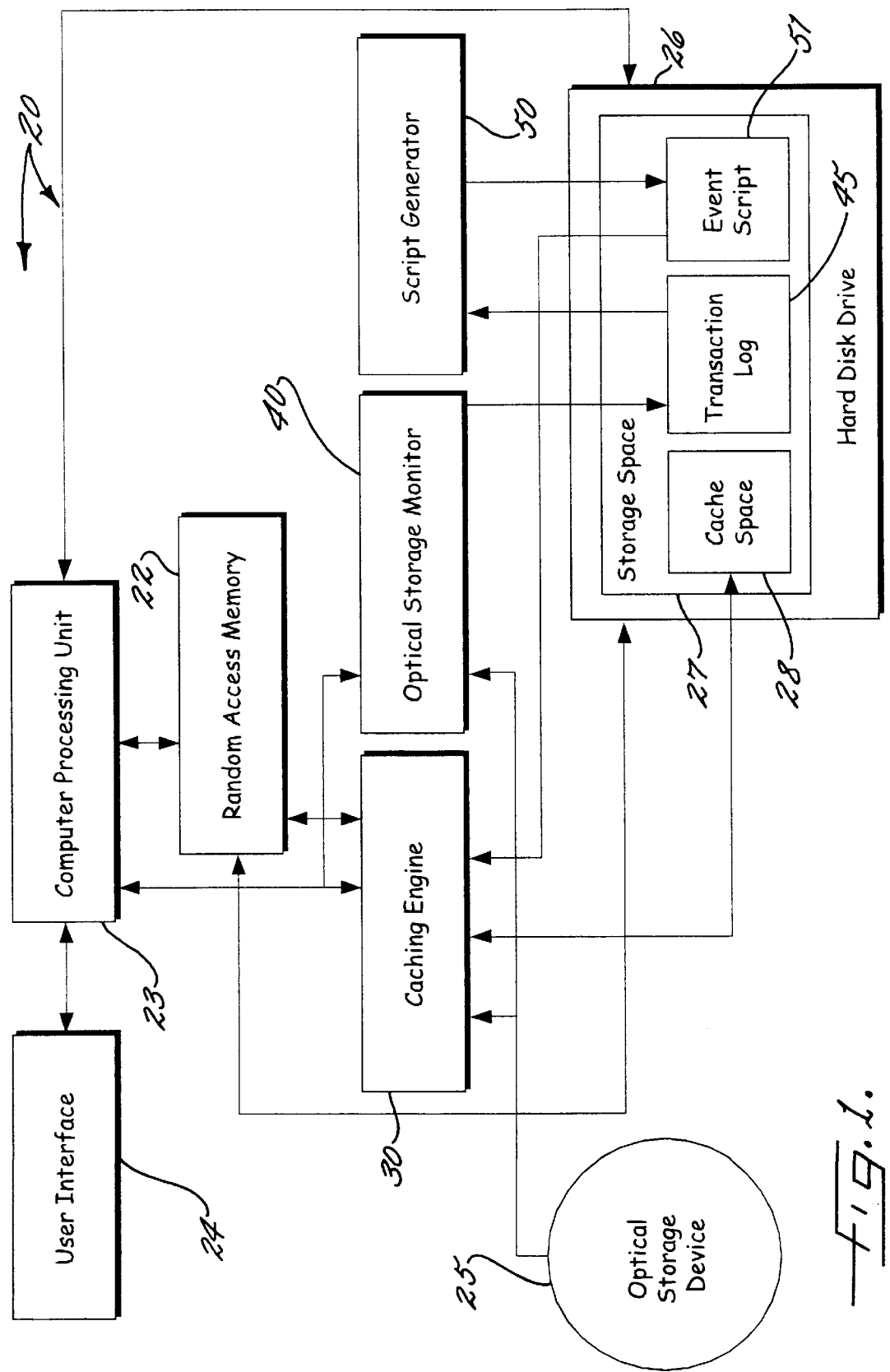
FIG. 1 is a schematic view of a caching apparatus according to a first embodiment of the present invention.
Figure 7A:
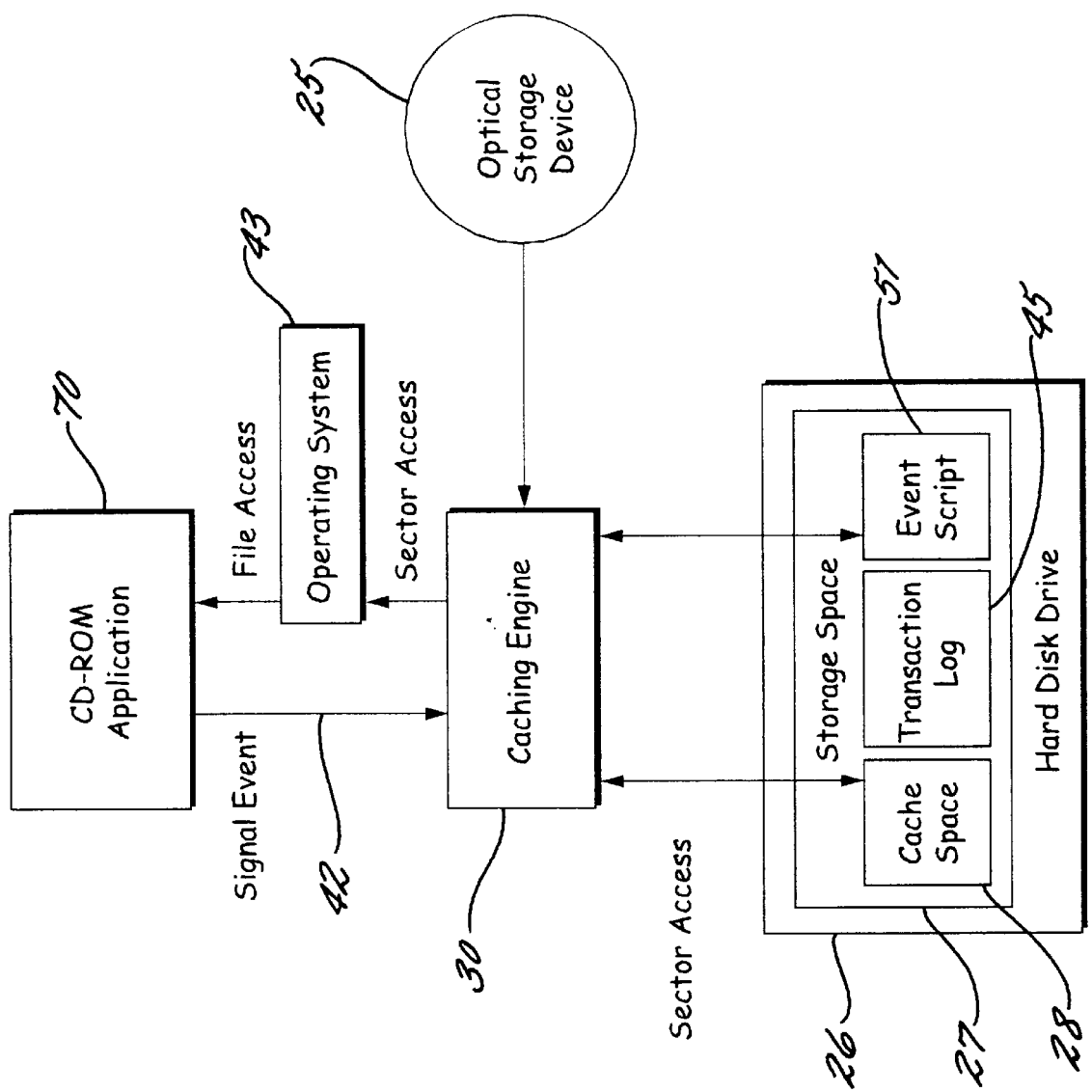
FIG. 7A is a schematic view of a caching apparatus having a local optical storage device according to a first embodiment of the present invention.

FIGS. 1 and 7A illustrate schematic views of a caching apparatus 20 according to the present invention. The caching apparatus 20 as illustrated preferably includes a first memory device 22 for storing data therein. The first memory device 22 preferably includes a predetermined application. The predetermined application is preferably at least portions of a software application program as understood by those skilled in the art. Examples of software application programs include accounting or tax software programs, database or file management software programs, interactive computer game programs, industrial design programs, document retrieval programs, and inventory control programs. Numerous other types of application programs for various industries, however, also exist and can be and continue to be developed as understood by those skilled in the art.

An optical storage device 25 is positioned in communication with the first memory device 22 for optically storing data therein. The optical storage device 25, as understood by those skilled in the art, includes a plurality of data storage sectors. The optical storage device is preferably a CD-ROM or other rotating storage device, but as understood by those skilled in the art other types of data storage devices that are conventionally slow and can benefit from significant reading speed enhancement can be used as well. A second memory device 26 is positioned in communication with the first memory device for storing data. The second memory device 26 preferably has a predetermined amount of data storage space 27. The predetermined amount of data storage space includes a caching space 28 defined by only a portion of the predetermined amount of data storage space of the second memory device 26. A caching engine 30 is positioned in communication with the first memory device 22, the second memory device 26, and the optical storage device 25 for temporarily storing data from the data storage sectors in the caching space 28 and thereby providing a quick transfer of the data to the first memory device 22 for use by the predetermined application. Event script providing means 51, e.g., a pre-generated event script data file or software program, is positioned in communication with the caching engine 30 for providing an event script to direct the caching engine 30 to transfer data sectors from the optical data storage device 25 to the caching space 28 in advance of being actually needed for the predetermined application of the first memory device 22.

An event script as defined herein preferably is a set of instructions for a caching engine 30 of the apparatus 20 which has a goal of maximizing or optimizing speed and balancing storage space constraints of a software application program. The event script would not be representative solely of a pattern of data based upon the order of previous access of an application program, but is clearly distinguishable and more advantageously would rather preferably include non-patternized and/or non-ordered reading/retrieving data for optimizing data retrieval characteristics of a caching space 28. An illustrative example would be like allowing a software program developer to write a script for a story which optimizes speed and usage of the caching space 28. Such a scripted story for usage of the caching space 28 allows creativity and optimization processes to work together to balance constraints of the computer system 18 so that reading/retrieving efficiency is significantly enhanced, e.g., as much as two times faster than some other known caching solutions.

A caching apparatus 20 for enhancing retrieval of data from the optical storage device 25 according to another aspect of the present invention preferably further includes a user interface 24, e.g., keyboard or keypad, modem, data monitor, mouse, touchscreen, or other user interfaces known or contemplated, and processing means 23, e.g., a processor (s), a computer processing unit ("CPU") such as a central processor or main processor, distributed processor(s), or a processing circuit, responsive to the user interface 24 for processing data. The first memory device 22 is preferably a random access memory ("RAM"), e.g., a volatile memory device, responsive to the processing means 23 for storing data. The RAM 22 or like memory device can be of hardware type configuration as understood by those skilled in the art that can be separate or a portion of a processor, or other software and/or hardware combination.

The second memory device 26 is preferably a hard disk drive, e.g., a nonvolatile memory device, positioned in communication with the random access memory 22 for storing data from the optical storage device 25. The hard disk drive 26 has a predetermined amount of data storage space 27. The predetermined amount of data storage space 27 preferably includes cache data storage means, e.g., a caching space 28, defined by only a portion of, and preferably a dedicated portion of, the predetermined amount of data storage space 27 of the hard disk drive 26 for temporarily storing data responsive to the random access memory 22 and for quickly transferring data to the random access memory 22. Because the caching space 28 forms a part of the predetermined amount of storage space 27 of a hard disk drive 26, the data temporarily stored in the caching space 28 advantageously is stored as nonvolatile data so that data can be retained from one session to another separate session of a user's interaction with an application. When frequently used data, for example, is retained between sessions, an application will often operate or run even faster in subsequent sessions according to a caching apparatus 20 of the present invention. It also will be understood by those skilled in the art that other types of non-volatile memory devices, or devices that function in this manner, may also be used according to a caching apparatus 20 of the present invention.

The caching engine 30 is preferably positioned responsive to the processing means 23, as well as being in communication with the RAM 22 and the optical storage device 25, for determining when data requested from the optical storage device 25 is stored in the caching space 28 and transferring the requested data from the caching space 28 of the hard disk drive 26 rather than from the optical storage device 25 thereby increasing the speed in which the requested data is delivered to the random access memory 22. The caching engine 30 is preferably a software program resident in the RAM 22. Nevertheless, it will be understood by those skilled in the art that the caching engine 30 could be formed by various software and/or hardware configurations as a separate device or resident within other portions of software or hardware of a computer system 18. Because the function, operation, and elements of the caching engine 30 form an important aspect of the present invention, especially in conjunction or combination with script generating means 50 and optical storage monitoring means 40 as described further herein, the caching engine 30 is described in further detail below with other important aspects of the invention.

Figure 3A:
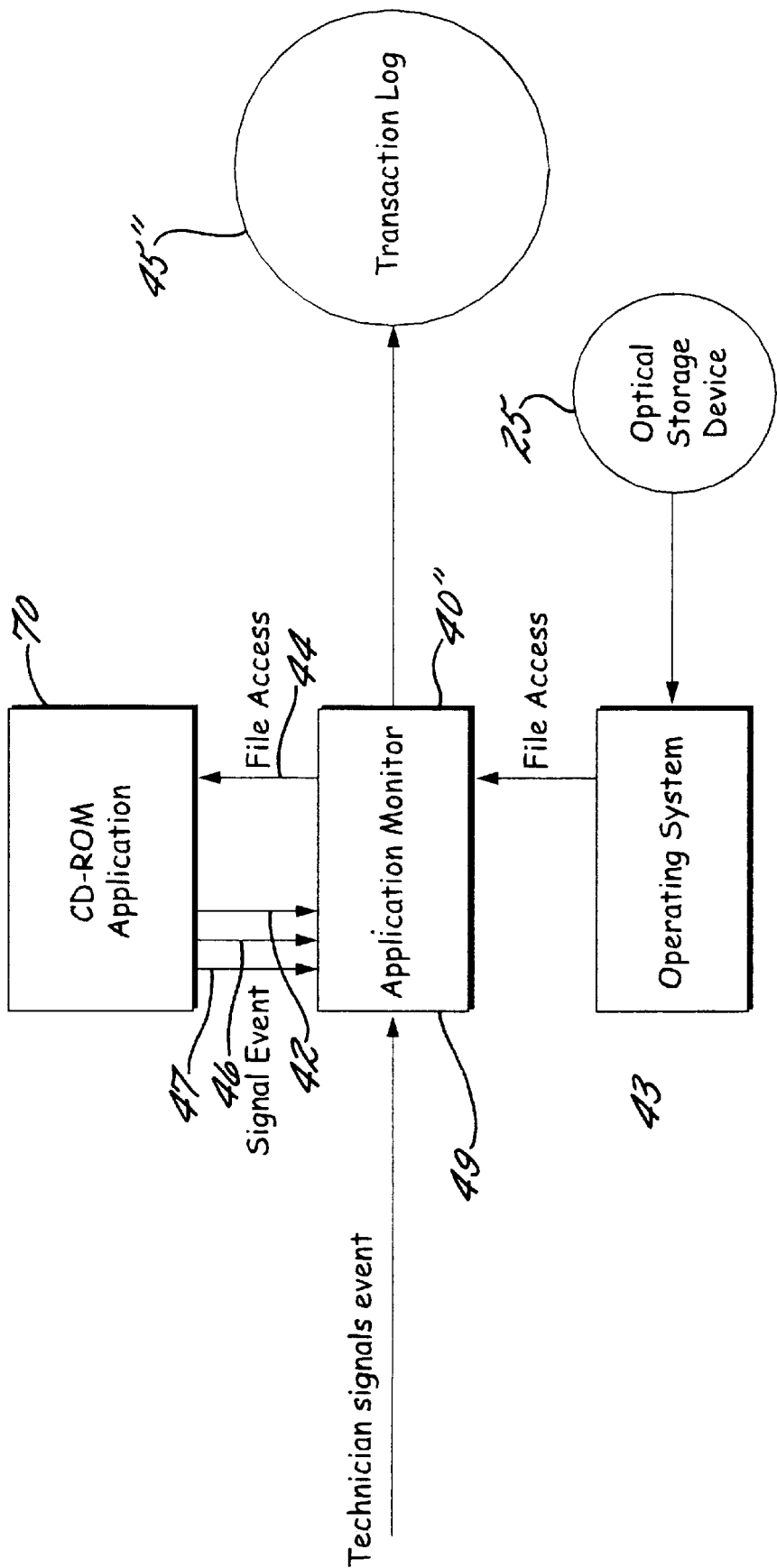
FIG. 3A is a schematic view of an optical storage monitor means, illustrated in the form of an application monitor, of a caching apparatus according to the present invention.

As best illustrated in FIGS. 3A–4, the caching apparatus 20 preferably further has optical storage access monitoring means 40, e.g., a computer program acting as an application monitor 40", responsive to the processing means 23, as well as in communication with the optical storage device 25, for monitoring data representative of access to the optical storage device 25 for a predetermined application. The application monitor 40" preferably monitors access to at least one optical data storage device 25 by a particular software application. Each read can be logged to logging means 45", e.g., a transaction log or data file(s) positioned responsive to the application monitor 40". This application monitor 40" advantageously can be used by a software application developer directly, with or without an application programming interface ("API"), or sent to a customizing lab for this purpose.

Figure 3B:
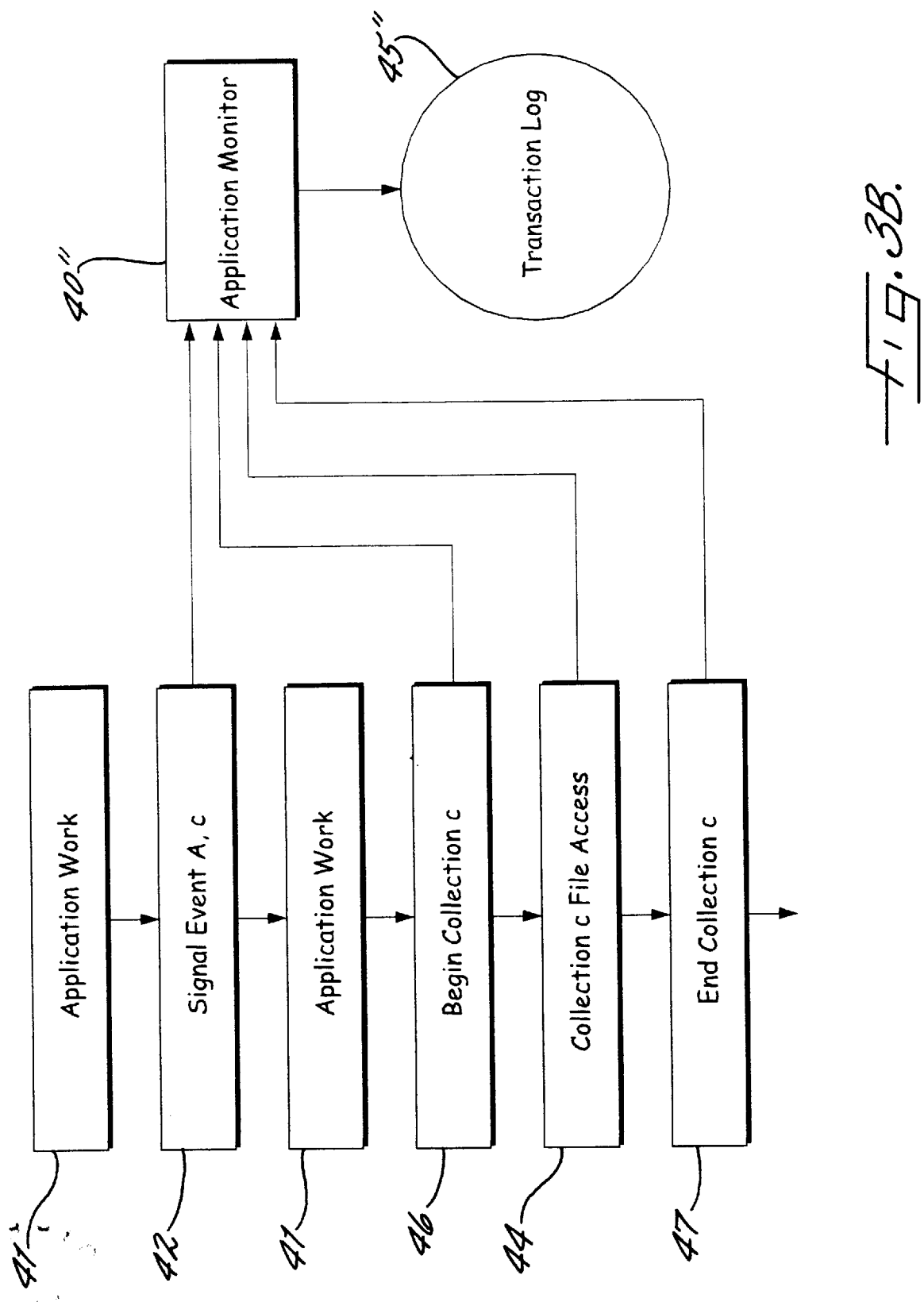
FIG. 3B is a schematic view of the optical storage monitor means, illustrated in the form of an application monitor, showing by way of example a series of steps performed by an application program according to the present invention.

The API advantageously can also be used to add predetermined events or parameters to the monitoring and/or logging cycles by the developer based upon the specific software application to further enhance the data retrieval function. As best illustrated in FIGS. 3A–3B, the developer or technician can signal an event(s) 49 or the software application can signal an event(s) 42 via the API for a particular application 41 and the application monitor 40", can collect data 44, 46, 47 related to preprogrammed phases of an application program to thereby designate or annotate access to files and subfiles of the application program for future retrieval or discard of data from the caching space 28 responsive to the signaled event(s).

The application developer can take an existing application program 70 which includes steps 41 that may or may not include access to the optical storage device 25 and step(s) 44 that specifically include access to the optical storage device 25. The application developer can then proceed to insert calls to the API including signal event 42 which predicts access 44 to the storage device 25, begins collection 46 marking the beginning of the access 44, and ends collection 46 marking the end of the access 44. The application monitor 40" can detect the signal event 42, begin collection 46, file access 44, and end collection 47 and transmit records serving as monitored access data describing the steps to transaction log 45".

Figure 5:
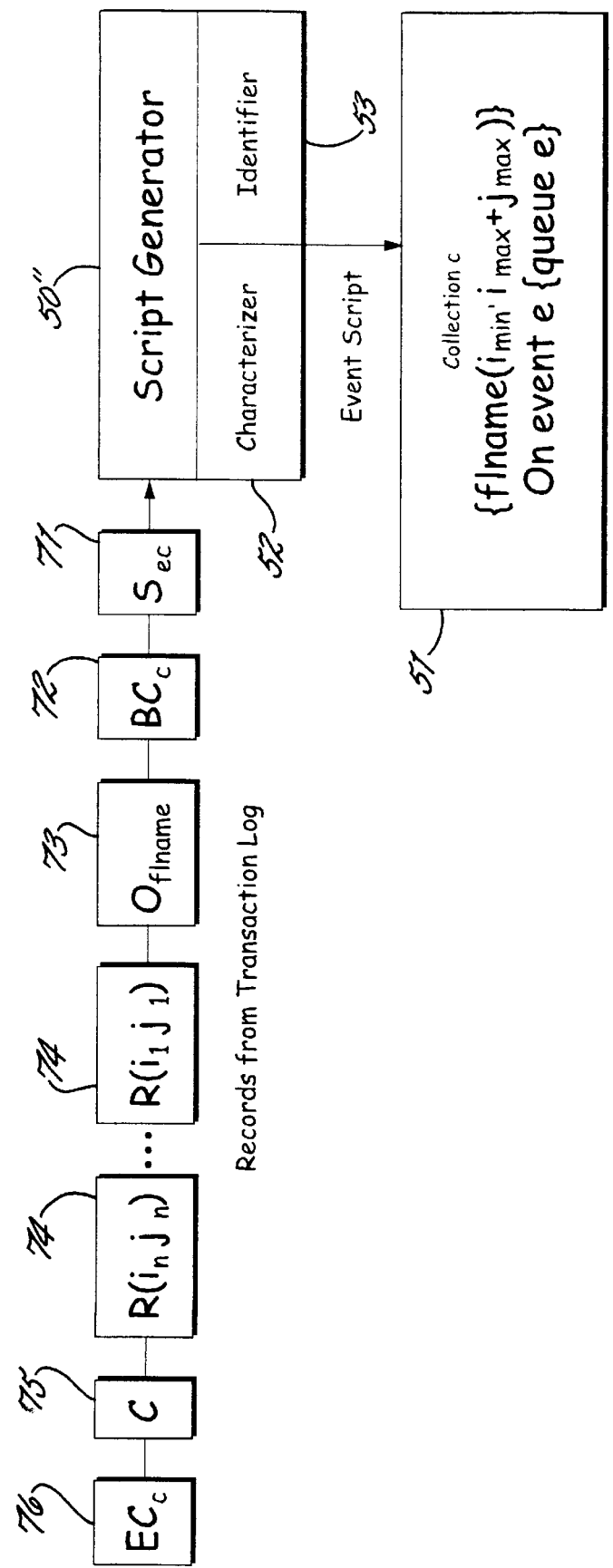
FIG. 5 is a schematic view of a script generator of a caching apparatus according to the present invention.
Figure 6A:
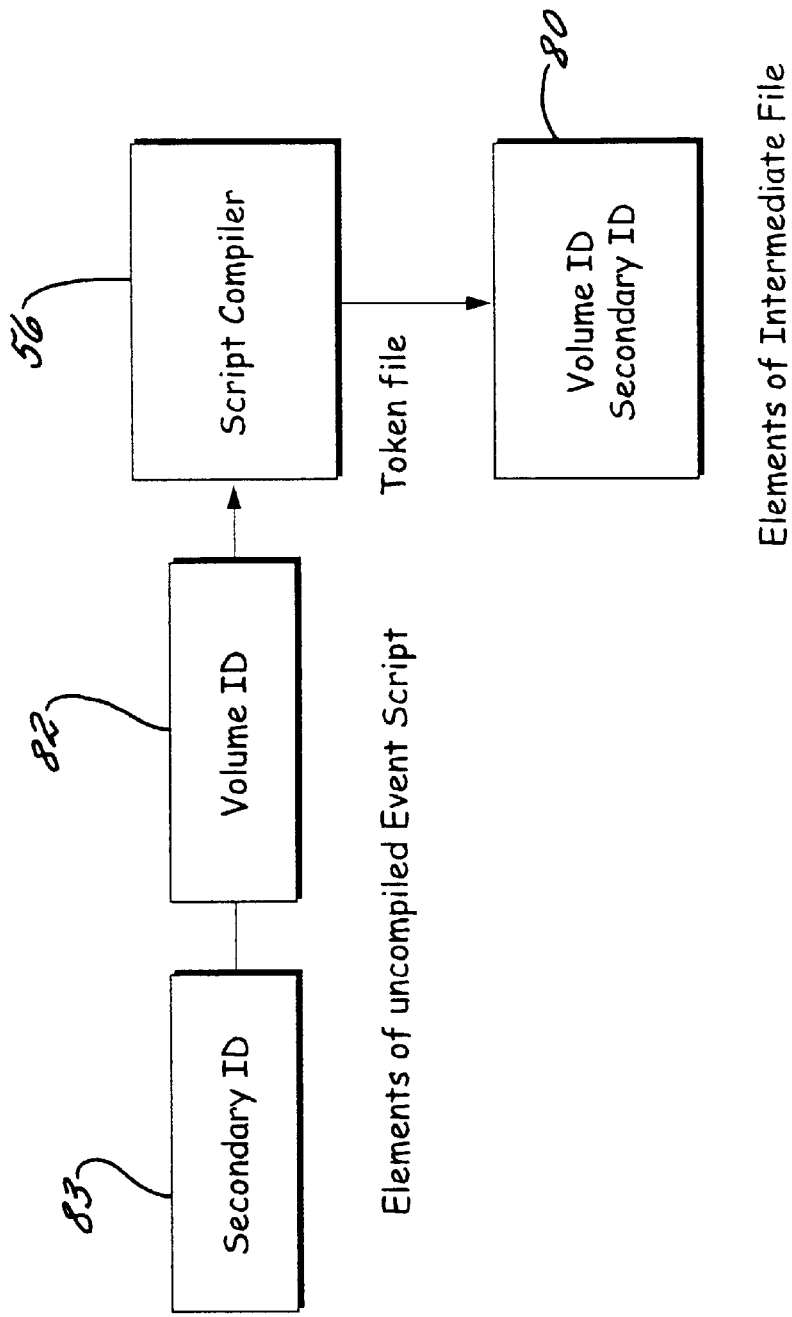
FIGS. 6A–6E are schematic views of a script compiler of a caching apparatus according to the present invention.
Figure 6B:
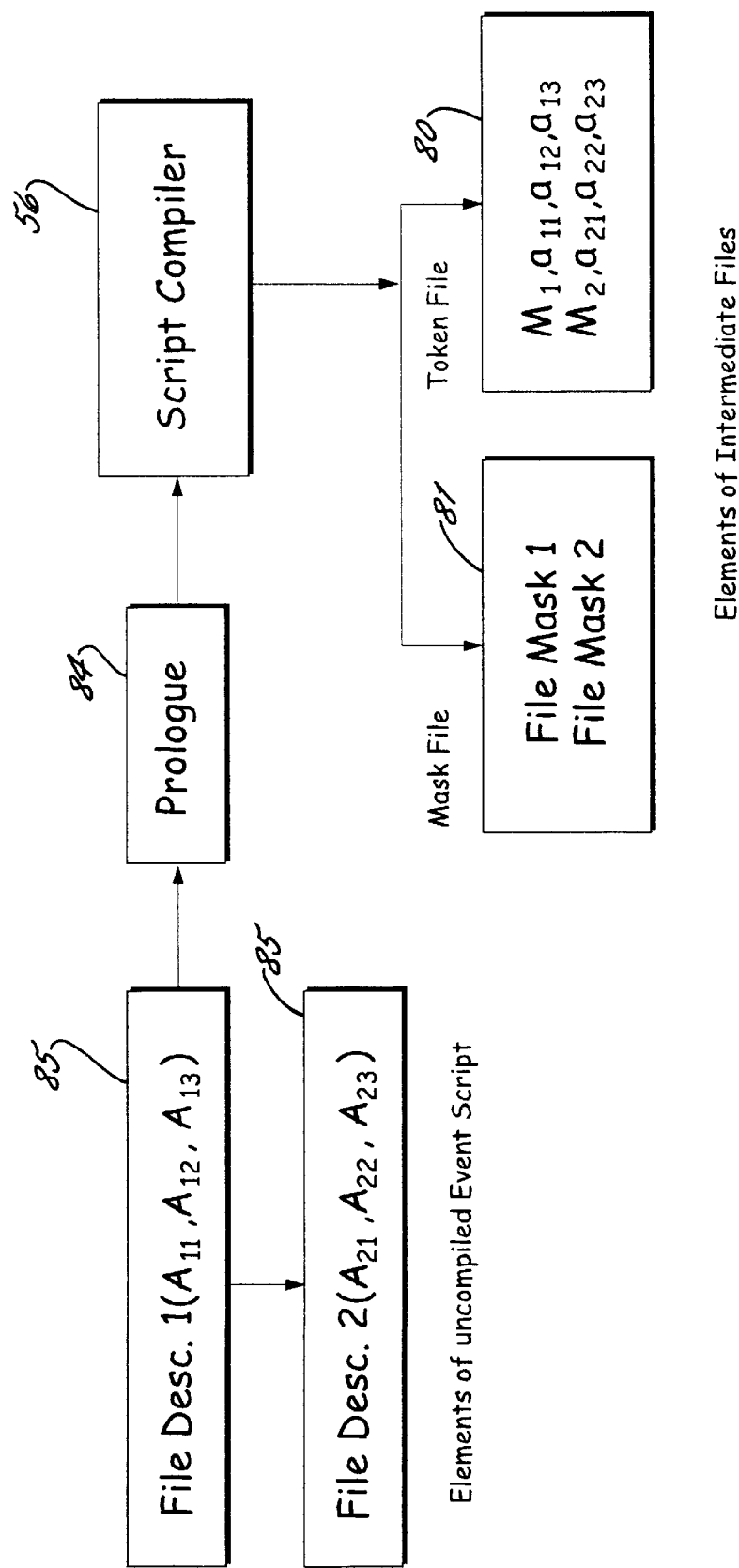
Figure 6C:
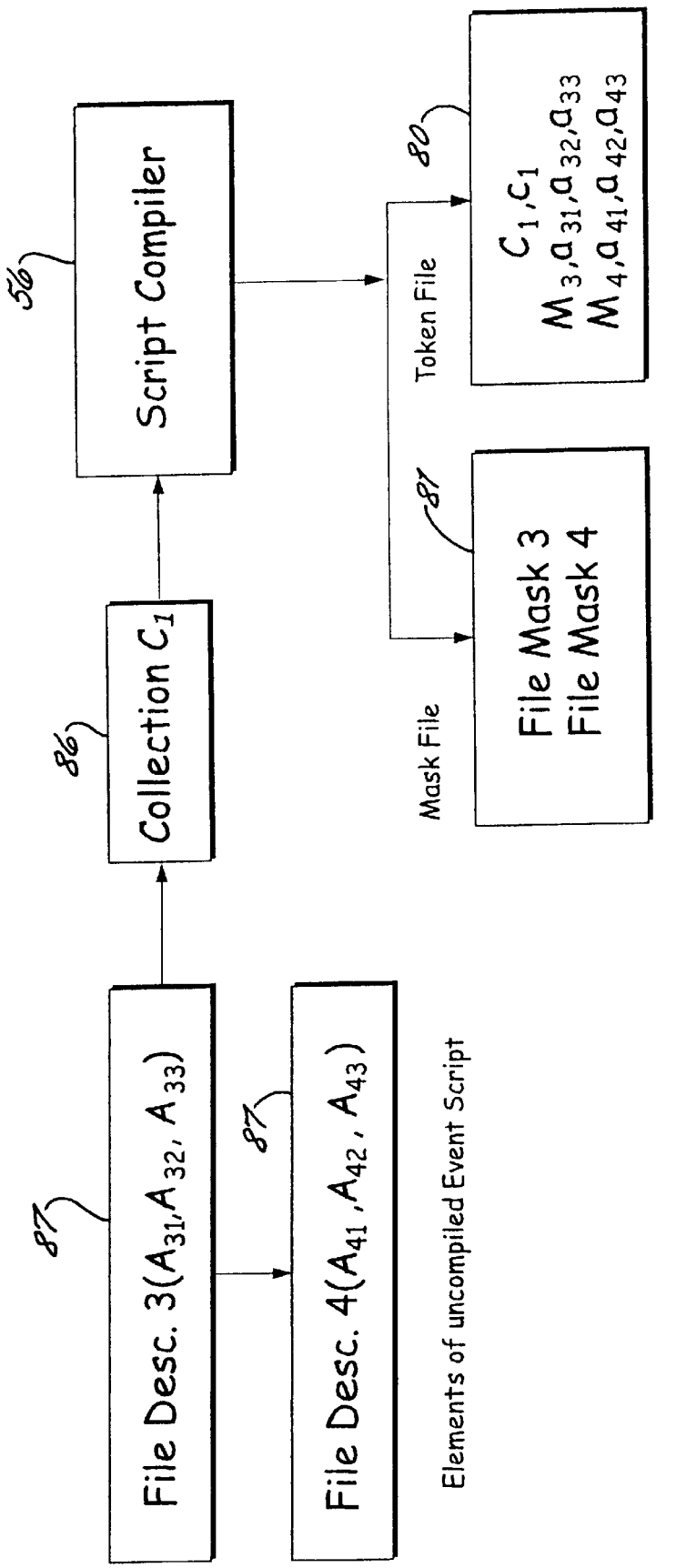
Figure 6D:
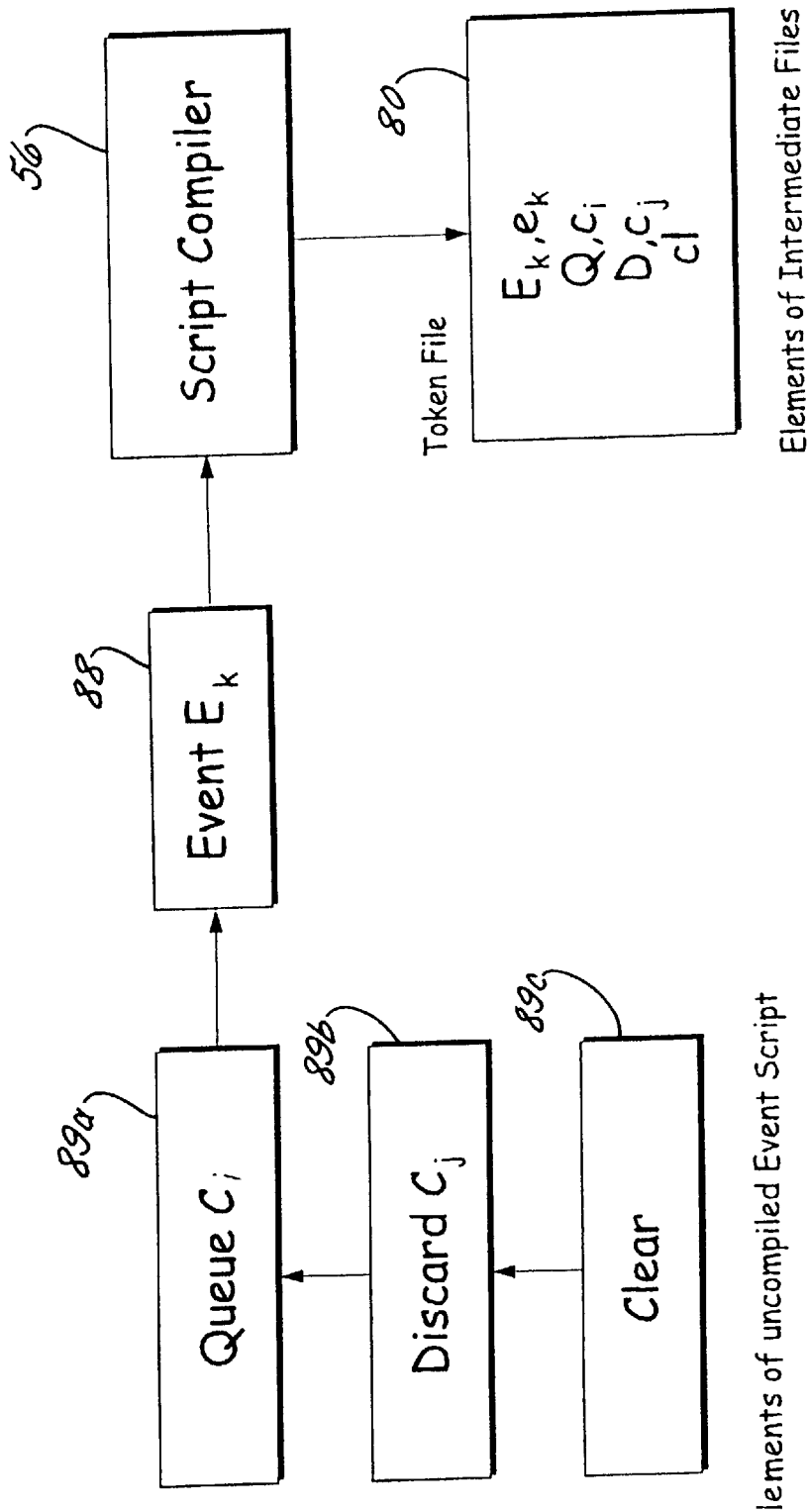
Figure 6E:
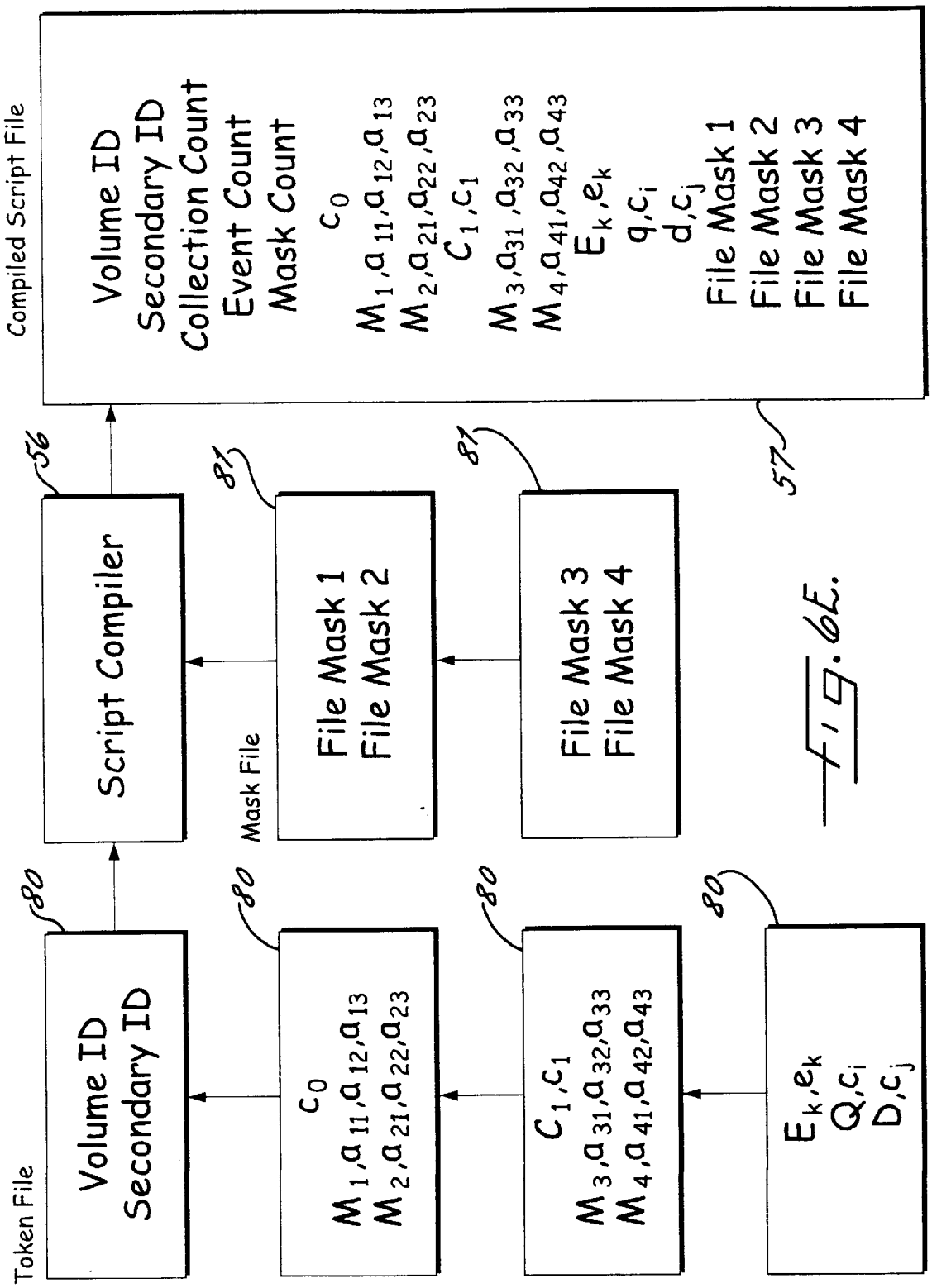

As best illustrated in FIGS. 4–5, script generating means 50, e.g., a computer program implementing such means, is preferably positioned responsive to the transaction log 45" for analyzing the monitored access data and generating an event script from the monitored access data that directs the caching engine 30 to transfer sectors of data from the optical data storage device 25 to the caching space 28 of the hard disk drive 26 in advance of being actually needed for the predetermined application. The script generator 50" serves as means for generating an event script. The script generator 50" preferably includes file data characterizing means 52, e.g., a data file characterizer as part of a software program, for characterizing file data accessed from the optical storage device 25 and characterization identifying means 53, e.g., a characterization identifier as part of a software program, responsive to the file data characterizing means for identifying the characterized file data. Records which can be logged from the application monitor 40", as best illustrated in FIG. 5 for example, can include signal(s) 71, begin collections 72, open a file 73, read a file 74, close a file 75, end collection 76, as well as names and values related thereto. The script generator 50" can produce an event script 51, illustrated here as being uncompiled at this stage of operation.

The uncompiled event script 51 is preferably generated by the script generator 50". Elements of the uncompiled event script 51, as illustrated in FIGS. 6A–6E, can include a volume identifier 82 and a secondary identifier 83, file descriptions 85, e.g. description of set(s) of files, and events such as queue 89a, discard 89b, or clear 89c.

The script generating means 50 also preferably includes a script compiler 56, as best illustrated in FIGS. 6A–6E, responsive to the event script generated by the script generator 50" for compiling event script instructions into a predetermined format, e.g., preferably a system code for the caching engine 30, that is interpreted by the caching engine 30 to thereby provide guidance for the operation of the caching engine 30. Intermediate files which include mask file(s) 81 and token file(s) 80 as illustrated can be created as an intermediate compiling step until formatting of the compile script into the desired system code occurs. The compiled script 57 is then transferred to the caching engine 30.

The application monitor 40, script event generator 50", and the script compiler 56 are considered "off-line tools" for the software application developer. The caching engine 30 is positioned responsive to the compiled event script 57, the optical data storage device 25, and the caching space 28 of the hard disk drive 26 to then follow through with the caching instructions during use of the software or predetermined application program provided by the software developer. Based upon the type of operating system a computer 18 is currently using, the caching engine 30 of the present invention advantageously can function either: (1) to disable an existing caching function of an operating system 43; or (2) to complement an existing caching function of an operating system 43.

Figure 11:
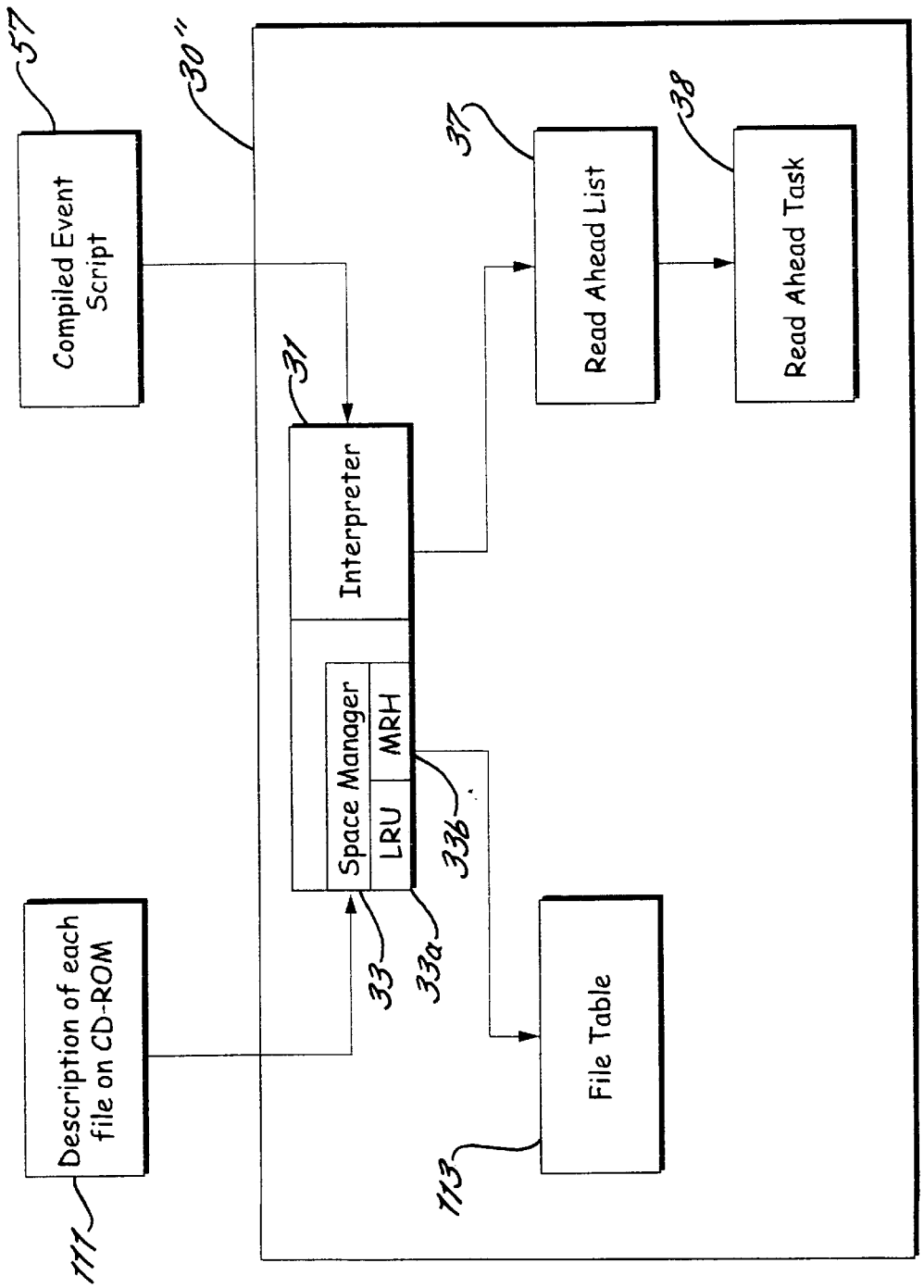
FIG. 11 is a schematic view of a caching engine and associated methods of a caching apparatus according to the present invention.
Figure 12:
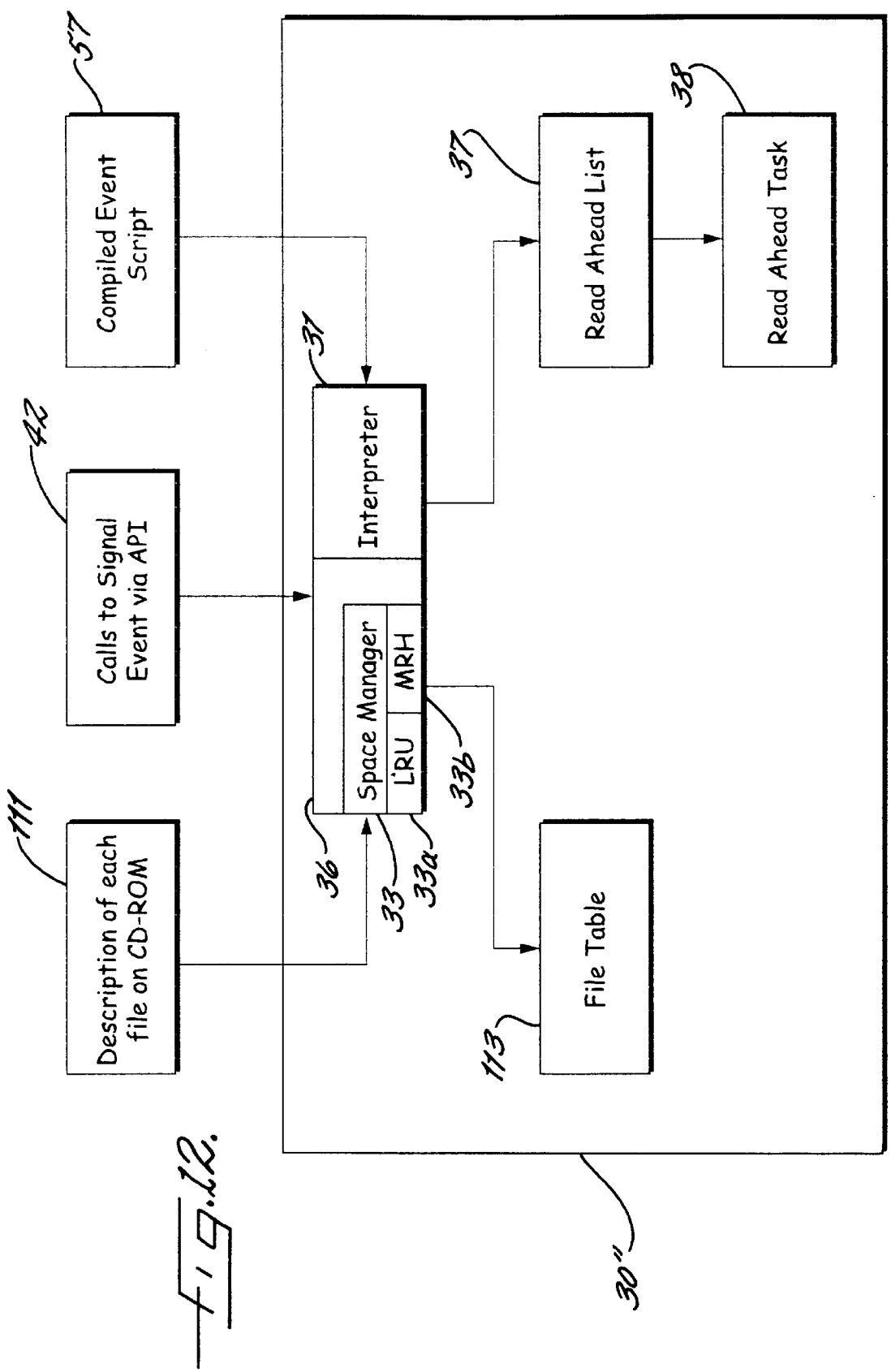
FIG. 12 is a schematic view of a caching engine and associated methods of a caching apparatus according to still another aspect of the present invention.

As illustrated in FIGS. 11–12, the caching engine 30 preferably includes interpreting means 31 responsive to the script generating means 50 for interpreting a plurality of predetermined caching instructions which preferably include the generated event script. The caching engine 30 is capable of transferring collections which are files and subsets of files from the optical data storage device 25 to the caching space 28 based upon instructions in the event script. The interpreting means 31 of the caching engine 30 preferably includes event recognizing means 36 responsive to events signaled by the predetermined application for recognizing the signaling of events by the predetermined application and queuing means 37 responsive to the recognized signaled events for queuing requests for collections. The caching engine 30 initiates transfers by queuing requests, e.g., via queuing means 37 or a queuing system as part of a software program, for transfers when it receives a signal event function from an application via the API.

The caching engine 30 preferably also has data collecting means 38 positioned responsive to the queuing means 37, e.g., a list of read ahead requests, for asynchronously collecting the identified file data from predetermined data sectors of the optical storage device 25 and storing the predetermined data sectors in the cache space 28 of the hard disk drive 27. Directory data 111 describing the optical storage device 25 is used by the caching engine 30" to create a file table 113 for describing the files on optical storage device 25 and caching policies applying to the files. The directory data is accessed by the caching engine 30" to generate requests 37. The request for a collection, in essence, drives a read ahead process (e.g., see FIG. 9) of the caching engine 30. Each collection preferably is a set of files and subfiles. Each subfile or subset of a file is described in terms of an offset and a length, e.g., from offset x for y bytes in file. This collection also can advantageously override other caching policies or priorities for files in collection, and a size qualifier can be provided so that a file or subfile is only used if it is no more than a specified percentage of cache space size. The caching engine 30 matches the event number with event numbers given in the event script and queues the request(s) indicated for the event by the event script. The event script may also indicate that the space associated with certain collections are to be reused or that all outstanding queued requests be discarded when certain events occur. In either case, the caching engine 30 performs such steps when the corresponding event is signaled by the application.

Further, the interpreting means 31 of the caching engine 30 can also include predetermined caching instructions, e.g., policies and priorities, which can either be selected by the event script or the engine 30 will proceed with preselected caching policies, replacement policies, and priority policies. The caching policies of the present invention, for example, can advantageously include the following predetermined instructions: (1) read entire file when an application reads only a portion of the file; (2) read ahead a specific amount of a file when only a portion of the file has been read; (3) retain portions of a file in the caching space without reading ahead a portion or the entire file; (4) avoids all portions of a file and do not place them in the caching space. As understood by those skilled in the art, each of these instructions are preferably in the form of software program data files or software programs themselves that form the means for accomplishing these functions.

Figure 8:
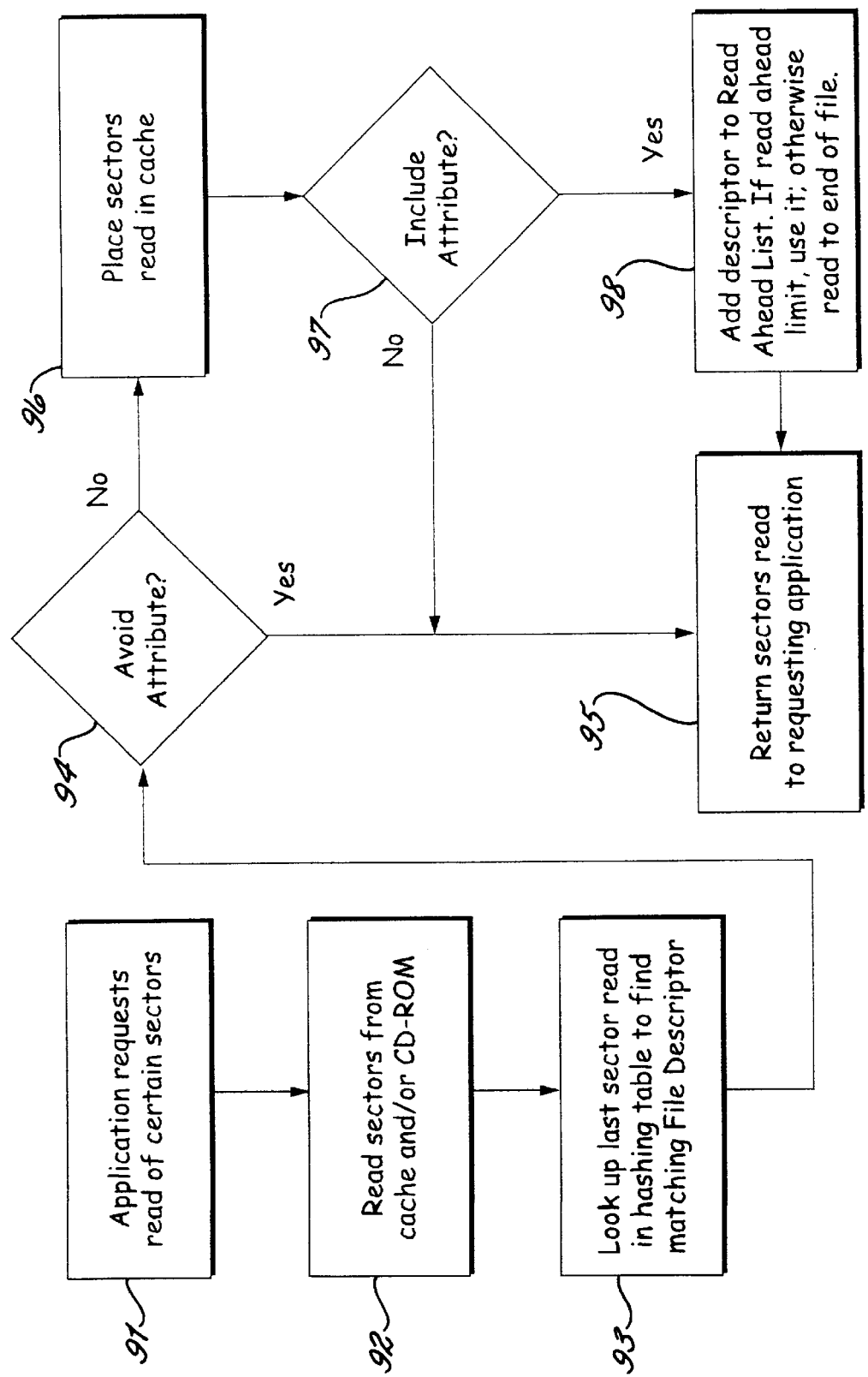
FIG. 8 is a schematic view of a caching method of a caching engine of a caching apparatus according to the present invention.

As illustrated in FIG. 8, the caching engine 30 performs a series of steps whenever an application requests data from the optical storage device 25. In step 91, the caching engine 30 analyzes each request by an application for data from an optical storage device 25. In step 92, the requested data is read from the appropriate combination of the cache space 28 and the optical storage device 25. In step 93, the sector number of the last sector read is used as a key in a search operation and a file descriptor is identified. In step 94, a decision is made according to whether the file descriptor indicates the sector has the avoid attribute. If the avoid attribute 94 is not indicated, step 95 is performed whereby the new sectors are placed in the cache space, otherwise processing skips to step 95. After sectors are placed in the cache 96, a decision is made according to whether the file descriptor indicates the sector has the include attribute 97. If the include attribute is indicated, step 98 is performed whereby a descriptor is added to the read ahead list either with a read ahead limit if one is indicated in the file descriptor or without one otherwise. Execution then proceeds to step 95 whereby the sectors read are returned to the requesting application.

Figure 9:
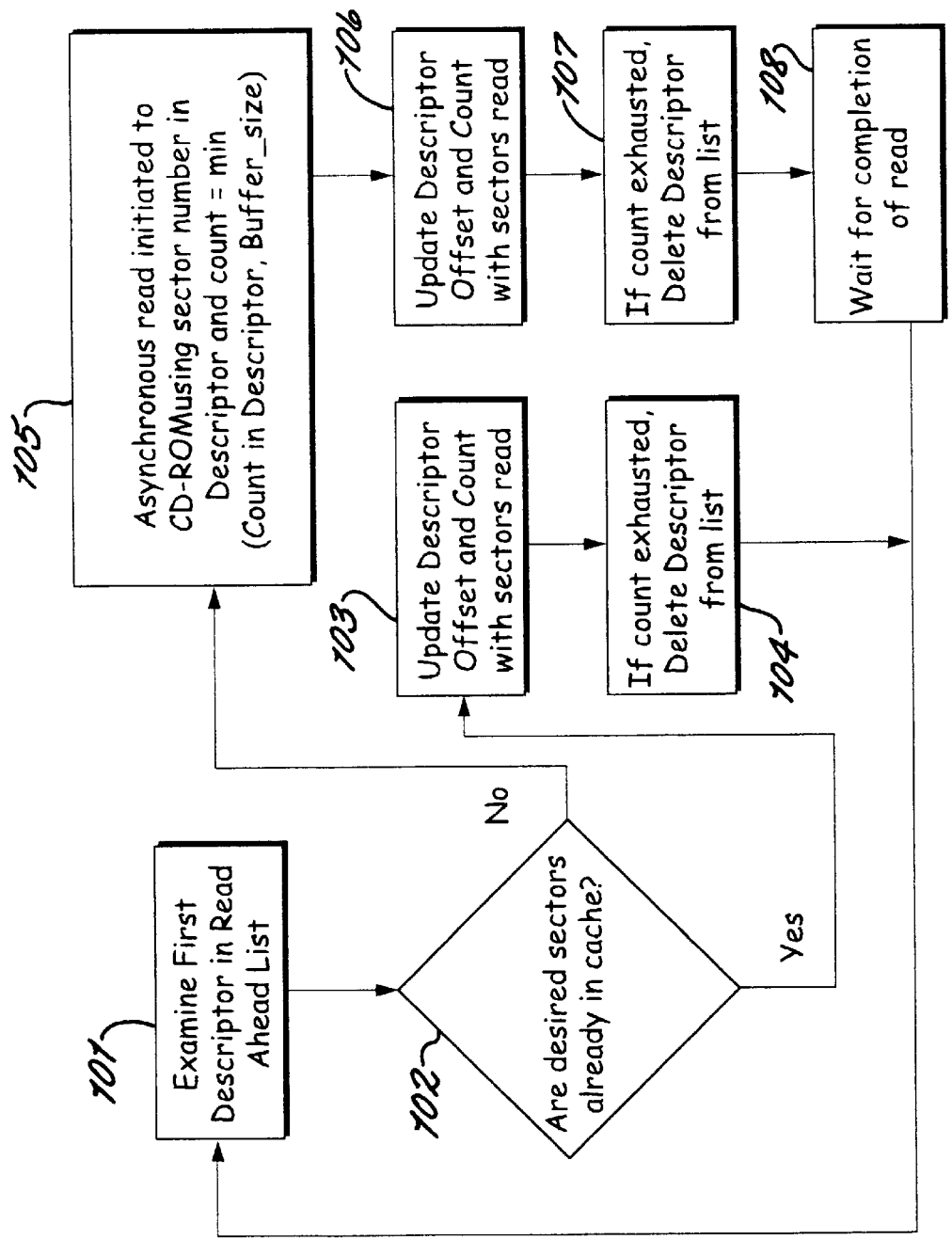
FIG. 9 is a schematic view of a read ahead method of a caching engine of a caching apparatus according to the present invention.

As illustrated in FIG. 9, the caching engine 30, more particularly the read ahead task 38, performs a series of steps to collect identified file data from the optical storage device 25. In step 101, each descriptor is examined in the read ahead list 37. In step 102, a decision is made according to whether the sectors described by the read ahead descriptor are present in the cache space 28. If the sectors are found in the cache space 28, step 103 is performed and the descriptor is updated according to the number of sectors found in the cache space 28. In step 104, if the request described by the read ahead descriptor is exhausted, the descriptor is removed from the read ahead list 37. If the requested sectors are not found in the cache space 28, step 105 is performed, whereby an asynchronous read is initiated from the optical storage device 25 using the sector number found in the descriptor. The number of sectors read is equal to the greater of the number requested in the descriptor and the number of sectors that will fit in a buffer used for asynchronous reading. Step 106 is then performed whereby the read ahead descriptor is updated according to the number of sectors read. In step 107, the descriptor is removed from the read ahead list 37 if its request has been exhausted. The read ahead task 38 waits for the asynchronous read to complete 108, allowing other tasks to continue in the meantime.

Figure 10:
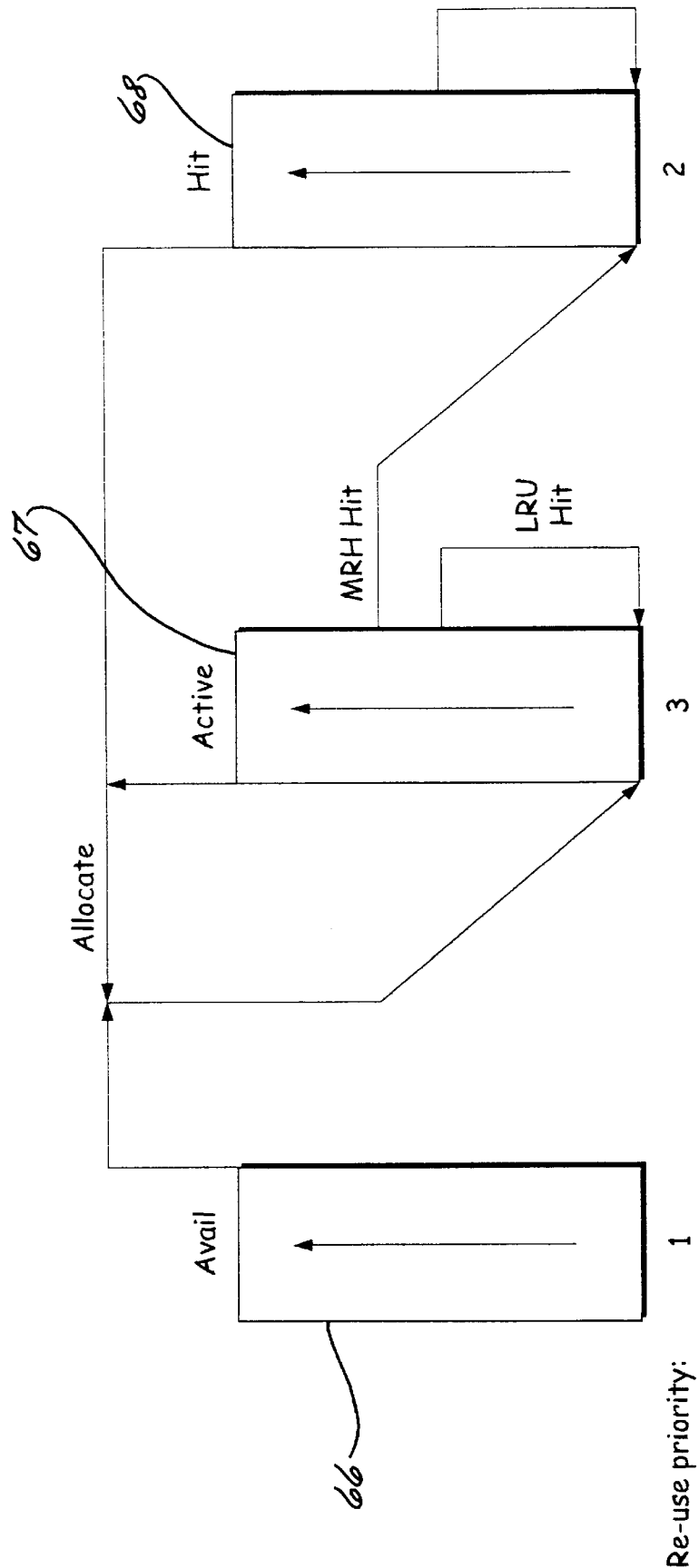
FIG. 10 is a graphical view of a method of replacing data in a caching space of a caching apparatus according to the present invention.

The interpreting means 31, e.g., interpretter ("Int."), of the caching engine 30 further includes data replacing means for replacing data temporarily stored in the caching space 28 with additional data (see FIGS. 10–12). The data replacing means 33, e.g., a space manager, preferably includes least-recently-used discarding means 33a for discarding data responsive to least recently used data and most-recently-hit discarding means 33b for discarding data responsive to a recent read of the data.

As best illustrated in FIGS. 10–12, and particularly FIG. 10, the replacement policies of the data replacing means 33 preferably include a combination of least recently used ("LRU") instructions 33a and most recently hit ("MRH") or used instructions 33b which assist in managing the cache space 28 and establishing re-use data priorities for allocating available space 66 based upon active data 67 within the space and hits 68 of that data. The LRU instructions 33a, as understood by those skilled in the art, are conventional in the art and as such will not be described in further detail herein, but the MRH 33b instructions allocate space by replacing data after it has been recently used. This concept is based upon recognizing that certain parts of programs or data retrieved is only needed once or twice during the entire application program use. This MRH concept, for example, advantageously can also be based upon predetermined statistical uses of portions of data after it is retrieved a predetermined number of times. This type of combination of replacement policies is particularly advantageous for a caching apparatus 20 that includes a script generator 51 because such a replacement policy system further allows the caching apparatus 20 to generate an event script that optimizes the use of the caching space 28.

A caching apparatus 20 according to this aspect of the present invention, for example, can also advantageously include user modifying means 45 responsive to the processing means 23 for modifying a generated event script. The user input means or user interface 24 is also positioned in communication with the script generating means 30, e.g., preferably through the processing means 23, for inputting predetermined event script parameters from a user for a generated event script. These modifying means 45 and user input means 23 can thereby advantageously allow the software developer or other technician, for example, to interactively provide parameter data that would modify, enhance, fine-tune, and/or customize the generated event script for a particular application program.

Figure 2:
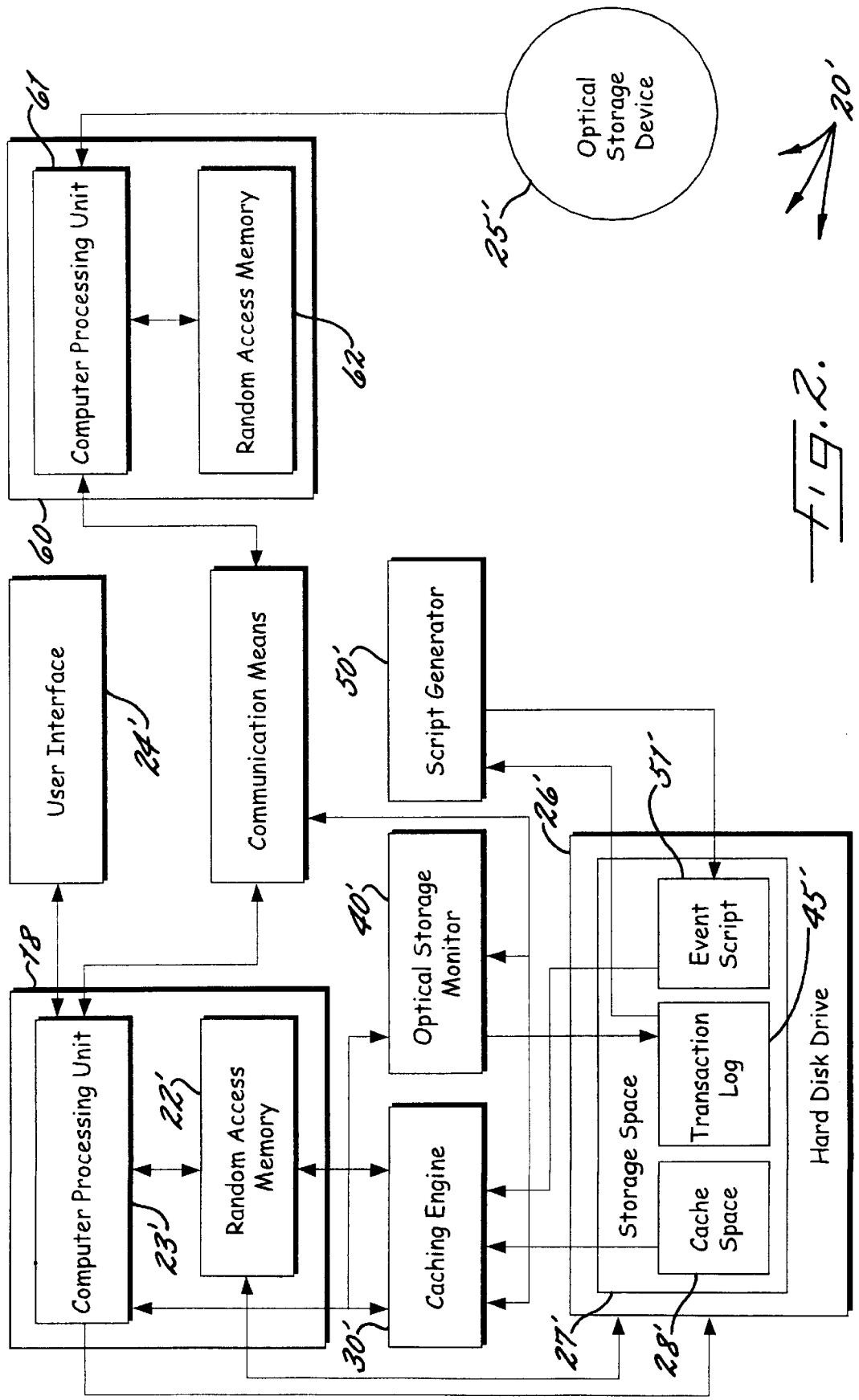
FIG. 2 is a schematic view of a caching apparatus according to a second embodiment of the present invention.
Figure 7B:
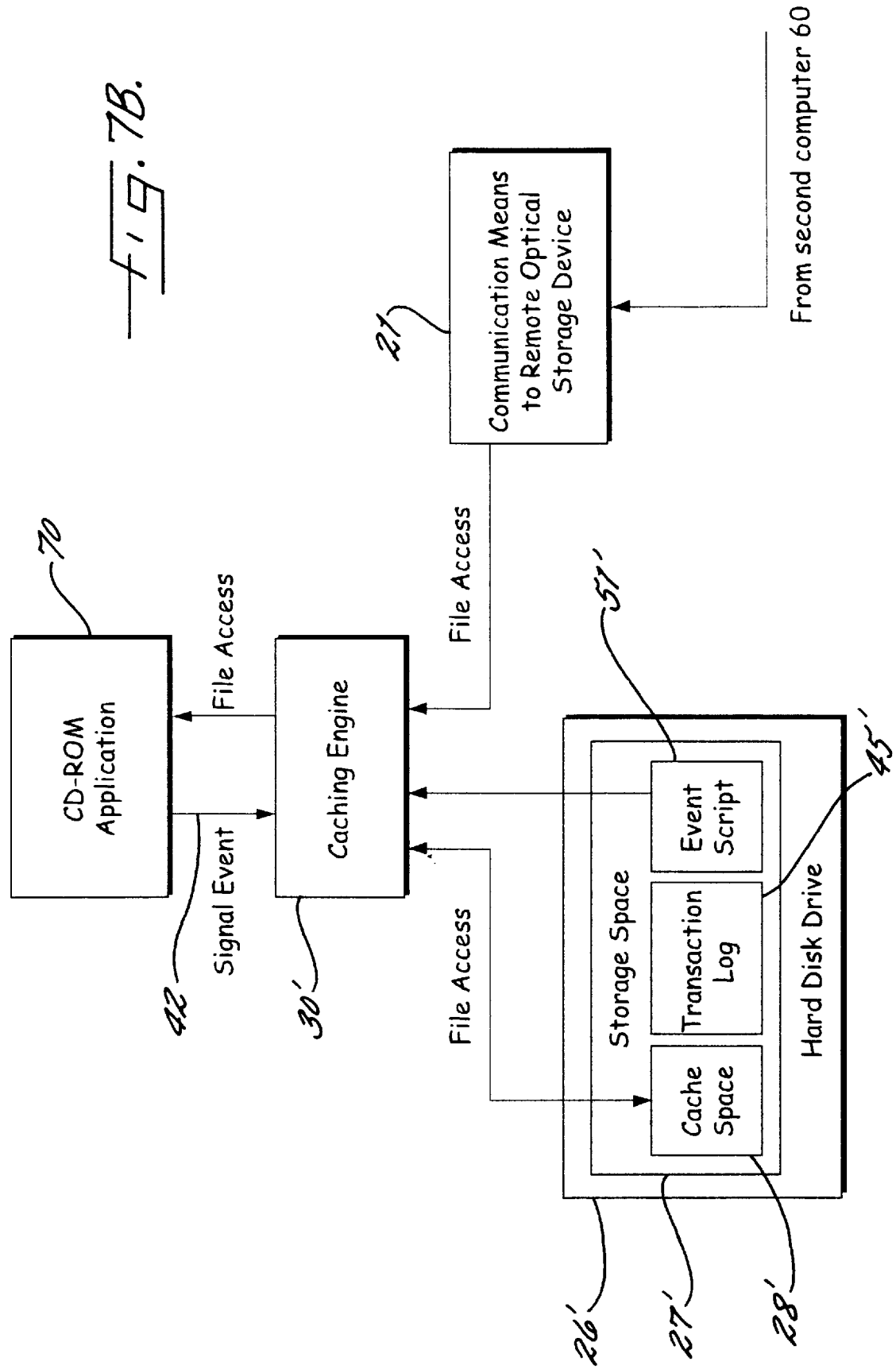
FIG. 7B is a schematic view of a caching apparatus having a remote optical storage device according to a second embodiment of the present invention.

Alternatively, instead of the optical storage device 25 residing in close proximity to the first memory device 22, the optical storage device 25 may be physically separated from the first memory device. When this separation is in effect, a second embodiment of the present invention can be used taking the form of a caching apparatus 20' as illustrated in FIGS. 2 and 7B. A first computer 18 has a first processing means 23', and a first memory device 22' positioned in communication with the caching engine 30'. A second computer 60 has second processing means 61, e.g., a processor, and a second memory device 62 is positioned in communication with at least one optical storage device 25'. Communicating means 21, local area network adapter, data bus, and/or data link, is positioned in communication with first processing means 23' and second processing means 61 for providing a data communication link or bus between the first computer 18 and the second computer 60. The caching engine 30' is also in communication with communicating means 21 such that it can gain access to the optical storage device(s) 25'. A third memory device 26' preferably has a predetermined amount of data storage space 27'. The predetermined amount of data storage space includes a caching space 28' defined by only a portion of the predetermined amount of data storage space of the third memory device 26'. The caching engine 30' is positioned in communication with the first memory device 22', the third memory device 26', and the communicating means 21 for temporarily storing data from the data storage sectors in the caching space 28' and thereby providing a quick transfer of data to the first memory device 22' for use by an application. Event script providing means 51' is positioned in communication with the caching engine 30' for providing an event script to direct the caching engine 30' to transfer data sectors from the optical data storage device 25' to the caching space 28' in advance of being actually needed for the predetermined application of the first memory device 22'.

A caching apparatus 20' for enhancing retrieval of data from an optical storage device according to this second embodiment of the present invention preferably includes a user interface 24', e.g., keyboard or keypad, modem, data monitor, mouse, touchscreen, or other user interfaces known or contemplated, and a first processor 23' responsive to the user interface for processing data. A first memory device 22' is positioned responsive to the first processor 23' for storing data. A caching engine 30' is preferably positioned responsive to the first processor 23' for transferring sectors of data. A second processor 63 preferably is provided for processing data, and a second memory device 62 is positioned responsive to the second processor 63 and positioned in communication with the first memory device 22' for storing data. At least one optical storage device 25' is positioned responsive to the second processor 63 and positioned in communication with the second memory device 62 for optically storing data therein. The at least one optical storage device 25' includes a plurality of data storage sectors.

A third memory device 26' is positioned in communication with the first memory device 22' for storing data transferred from the second memory device 62 and the at least one optical storage device 25' and from the first memory device 22' positioned in communication with the second memory device 62. The third memory device 26' preferably is also hard disk drive type memory, as understood by those skilled in the art, that has a predetermined amount of data storage space 27' which includes a caching space 28' defined by only a portion of the predetermined amount of data storage space 27' of the third memory device 26' for temporarily storing data from the at least one optical storage device 25 and for quickly transferring data to the first memory device 22.

An optical storage access monitor 40' is positioned responsive to the caching engine 30' of the first memory device 22' for monitoring data representative of data transfers from the at least one optical storage device 25' and to the second memory device 62 and from the second memory device 62 to the first memory device 22' for a predetermined application.

A script generator 50' preferably is positioned responsive to the optical storage access monitor 40' and positioned in communication with the caching engine 30' for analyzing the monitored access data and generating an event script from the analyzed access data that directs the caching engine 30' to transfer data sectors from the at least one optical data storage device 25' to the caching space 28' of the third memory device 26' in advance of being actually needed for the predetermined application.

Figure 13:
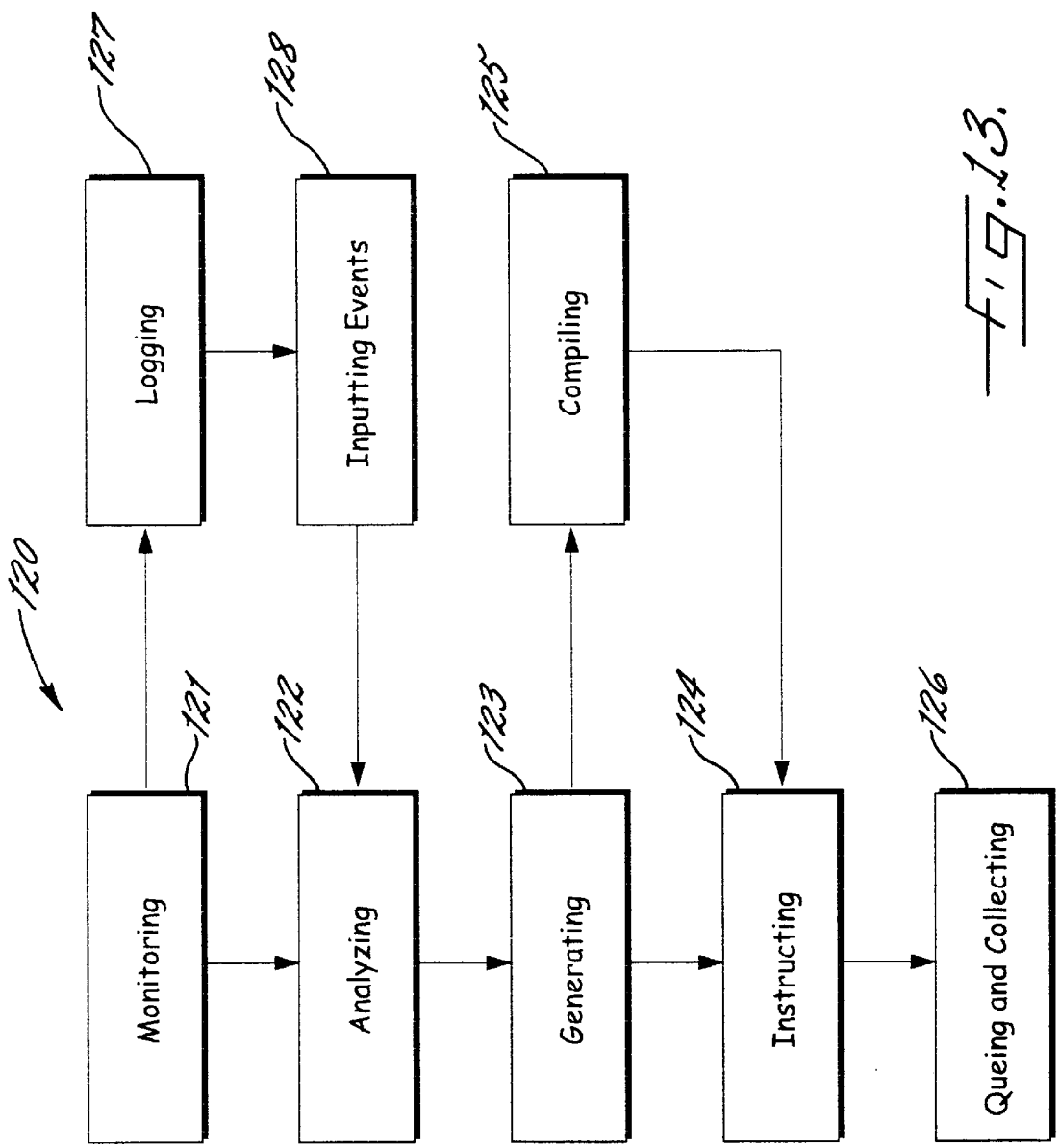
FIG. 13 is a schematic view of a method of enhancing retrieval of data from a storage device according to the present invention.

As illustrated in FIGS. 1–15, and more particular in FIGS. 8–15, methods of enhancing the retrieval speed of data from a storage device are also provided according to the present invention. One method 120, as best illustrated in FIG. 13, preferably includes monitoring data 121 representative of access to an optical storage device for a predetermined application and analyzing 122 the monitored access data. An event script is generated 123 for a caching engine responsive to the analyzed access data, and the caching engine is instructed 124 which sectors to transfer from an optical storage device in advance of being actually needed responsive to the event script.

The analyzing step 122 can include characterizing file data accessed from the optical storage device and identifying the characterized file data. This method can also include compiling 125 event script instructions into a predetermined format that is interpreted by the caching engine to thereby provide a more efficient means of instructing the caching engine. The event script preferably includes instructions which the caching engine interprets responsive to predetermined events signaled by the predetermined application. The method additionally can include queuing requests for collections of characterized file data from the optical storage device and asynchronously collecting the characterized file data from predetermined data sectors of the optical storage device.

The caching instructions generating according to this method, for example, can include reading an entire file responsive to an application reading only a portion of a file, reading ahead a predetermined number of sectors responsive to an application only reading a portion of a file, selectively retaining sectors of a file, and avoiding at least predetermined portions of a file and not storing them in the caching space. The predetermined caching instructions can further include instructions for replacing predetermined data temporarily stored in the caching space with additional data according to a most-recently-hit policy, and the method further discards the predetermined data responsive to a recent hit of the data (see FIG. 10).

This method yet can further include logging optical storage device access data 127 prior to generating a script for the caching engine and inputting user selected events 128 through a user interface for including in the monitored and analyzed access data and the generated event script. Predetermined event script parameters advantageously can be inputted from a user responsive to a user interface for a generated event script and modifying a generated event script.

Figure 14:
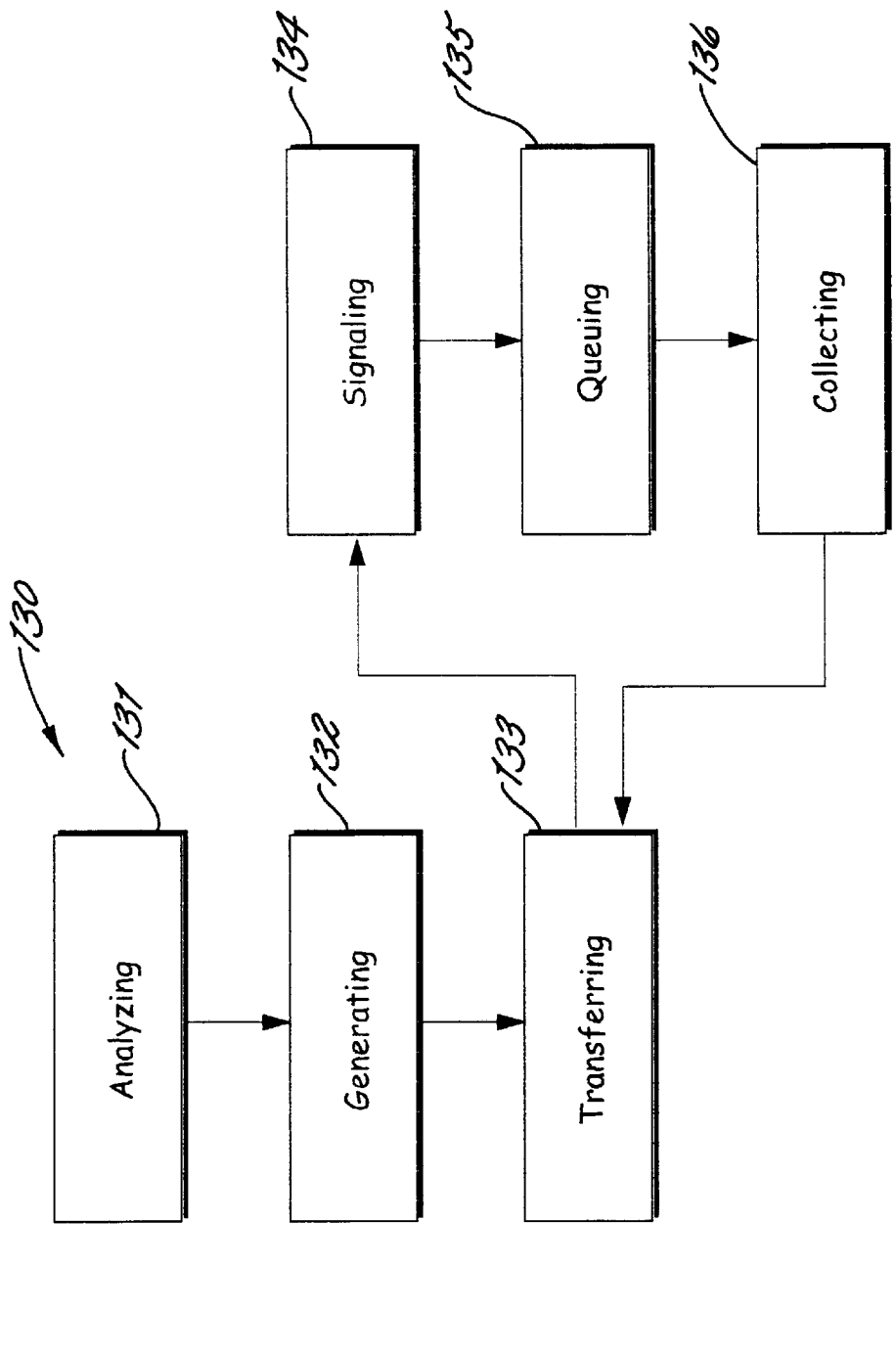
FIG. 14 is a schematic view of a method of enhancing retrieval of data from a storage device by a provided event script according to another aspect of the present invention.

Another method 130 of enhancing the retrieval speed of data from an optical storage device according to the present invention, as best illustrated in FIG. 14, preferably includes analyzing a predetermined application program 131 and generating an event script 132 responsive to the analyzed predetermined application program. Data from a second data storage device is then transferred 133 to a first data storage device in advance of actually being needed by the second data storage device responsive to the generated event script. The transferring of data can be performed by a caching engine which, for example, can be a computer program for storing in memory of a computer system. The generating of an event script is preferably performed by a computer program stored in memory of a computer system.

This additional method can further include signaling 134 to the caching engine from the application program that predetermined events have occurred, queuing requests 135 for collection of characterized file data from the first storage device, and asynchronously collecting 136 the characterized file data from data sectors of the storage device. A plurality of predetermined caching instructions can also be interpreted. The caching instructions can include reading an entire file responsive to an application reading only a portion of a file, reading ahead a predetermined number of sectors responsive to an application only reading a portion of a file, selectively retaining sectors of a file, and avoiding predetermined at least portions of a file and not storing them in the caching space. These generated instructions can further include replacing data temporarily stored in the caching space with additional data responsive to a predetermined replacement priority. The replacing data step preferably includes most-recently-hit discarding of data responsive to the recent reading of the data.

A further method 140 of enhancing the retrieval speed of data from an optical storage device according to the present invention, as best illustrated in FIG. 15, preferably includes characterizing file data accessed from an optical storage device 141 and identifying the characterized file data 142. An event is signaled 143 which represents an event associated with an application program. A request for a collection of characterized file data is queued 144 from the optical storage device responsive to the signaled event, and the characterized file data is asynchronously collected 145 from data sectors of the optical storage device in advance of actually being needed.

This further method can also include generating a plurality of predetermined caching instructions 146. The caching instructions generated can include reading an entire file responsive to an application reading only a portion of a file, reading ahead a predetermined number of sectors responsive to an application reading only a portion of a file, selectively retaining sectors of a file, and avoiding at least predetermined portions of a file and not storing them in the caching space. The instructions generated can also include replacing data temporarily stored in the caching space with additional data responsive to a predetermined replacement priority. The replacing data step preferably includes most-recently-hit discarding of data responsive to a recent reading of the data. This method can further advantageously include inputting predetermined parameters from a user 147 and generating a modified event script responsive to the user inputted parameters.

This type of analysis and generation of an event script by embodiments of a caching apparatus 20, 20' and methods according to the present invention significantly assists software application developers in maximizing or optimizing speed and balancing storage space constraints of a particular software application program which is being developed and thereby allows the software application developer to provide additional features to an application program, to store and more readily use additional data in an optical storage device, and to develop more complex and creative application programs. By optimally selecting and caching data from an application program stored in an optical storage device 25, 25', for example, a caching apparatus 20, 20' according to the present invention can advantageously provide a performance boost to a user even the first time data from the optical storage device 25, 25' is accessed. In contrast to conventional caching methods, a caching apparatus 20, 20' and methods according to the present invention thereby advantageously and significantly provides additional incentives and impetus to software developers to provide additional types, increased functional features, and increased user interaction aspects of software application programs for users of computer systems.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. A caching apparatus for enhancing retrieval of data from an optical storage device, the caching apparatus comprising:

a user interface;

processing means responsive to said user interface for processing data;

a random access memory responsive to said processing means for storing data;

a hard disk drive positioned in communication with said random access memory for storing data from said optical storage device, said hard disk drive having a predetermined amount of data storage space, the predetermined amount of data storage space including cache data storage means defined by only a portion of the predetermined amount of data storage space of said hard disk drive for temporarily storing data responsive to said random access memory and for quickly transferring data to said random access memory;

a caching engine responsive to said processing means for determining when data requested from said optical storage device is stored in said caching data storage means and transferring the requested data from said caching data storage means of said hard disk drive rather than from said optical storage device thereby increasing the speed in which the requested data is delivered to said random access memory;

optical storage access monitoring means responsive to said processing means for monitoring data representative of access to said optical storage device for a predetermined application; and script generating means responsive to said optical storage access monitoring means and positioned in communication with said caching engine for analyzing the monitored access data and generating an event script from the monitored access data that directs said caching engine to transfer sectors of data from said optical data storage device to said cache data storage means of said hard disk drive in advance of being actually needed for the predetermined application.

2. A caching apparatus as defined in claim 1, wherein said script generating means includes a script generator for generating an event script and a script compiler responsive to said script generator for compiling event script instructions into a predetermined format that is interpreted by said caching engine thereby providing guidance for the operation of said caching engine.

3. A caching apparatus as defined in claim 1, wherein said script generating means includes file data characterizing means for characterizing file data accessed from said optical storage device and characterization identifying means responsive to an file data characterizing means for identifying the characterized file data.

4. A caching apparatus as defined in claim 3, wherein said caching engine includes instruction interpreting means for interpreting instructions in the generated event script, said instruction interpreting means including event recognizing means responsive to events signaled by the predetermined application for recognizing the signaling of events by the predetermined application, queuing means responsive to the recognized signaled events for queuing requests for collections of the identified file data from said optical storage device, and data collecting means responsive to said queuing means for asynchronously collecting the identified file data from predetermined data sectors of said optical storage device and storing said predetermined data sectors in said cache data storage means of said hard disk drive.

5. A caching apparatus as defined in claim 1, wherein an caching engine includes interpreting means responsive to said script generating means for interpreting a plurality of predetermined caching instructions which include the generated event script, said interpreting means comprising entire file reading means for reading an entire file responsive to an application reading only a portion of a file, read ahead means for reading ahead a predetermined number of sectors responsive to an application only reading a portion of a file, selective retaining means for selectively retaining sectors of a file, and avoiding means for avoiding at least predetermined portions of a file and not storing them in said caching data storage means.

6. A caching apparatus as defined in claim 5, wherein said interpreting means further comprises data replacing means for replacing data temporarily stored in said caching data storage means with additional data, said data replacing means including most-recently-hit discarding means for discarding data responsive to a recent read of the data.

7. A caching apparatus as defined in claim 1, said optical storage access monitoring means further comprises logging means for logging optical storage device access data to supply to said script generating means, and wherein said optical storage access monitoring means includes user input means responsive to said processing means for inputting user selected events through said user interface for including in the monitored and analyzed access data and the generated event script generated by said script generating means.

8. A caching apparatus as defined in claim 7, wherein said script generating means includes user modifying means responsive to said processing means for modifying a generated event script, and wherein said user input means is also positioned in communication with said script generating means for inputting predetermined event script parameters from a user for a generated event script.

9. A caching apparatus for enhancing retrieval of data from an optical storage device, the caching apparatus comprising:

a user interface;

a first processor responsive to said user interface for processing data;

a first memory device responsive to said first processor for storing data;

a caching engine responsive to said first processor for transferring sectors of data;

a second processor for processing data;

a second memory device responsive to said second processor and positioned in communication with said first memory device for storing data;

a third memory device positioned in communication with said first memory device for storing data transferred from said second memory device and said optical storage device and from said first memory device positioned in communication with said second memory device, said third memory device having a predetermined amount of data storage space, the predetermined amount of data storage space including a caching space defined by only a portion of the predetermined amount of data storage space of said third memory device for temporarily storing data from said optical storage device and for quickly transferring data to said first memory device;

an optical storage access monitor responsive to said caching engine for monitoring data representative of data transfers from said optical storage device to said second memory device and from said second memory device to said first memory device for a predetermined application; and a script generator responsive to said optical storage access monitor and positioned in communication with said caching engine for analyzing the monitored access data and generating an event script from the analyzed access data that directs the caching engine to transfer data sectors from said optical data storage device to said caching space of said third memory device in advance of being actually needed for the predetermined application.

10. A caching apparatus as defined in claim 9, further comprising a script compiler responsive to said script generator for compiling event script instructions into a predetermined format that is interpreted by said caching engine thereby providing guidance for the operation of said caching engine.

11. A caching apparatus as defined in claim 9, wherein said script generator includes file data characterizing means for characterizing the file data accessed from said optical storage device and identifying means responsive to said file data characterizing means for identifying the characterized file data.

12. A caching apparatus as defined in claim 11, wherein said caching engine includes instruction interpreting means for interpreting instructions in the generated event script, said instruction interpreting means including event recognizing means responsive to events signaled by the predetermined application for recognizing the signaling of events by the predetermined application, queuing means responsive to the recognized signaled events for queuing requests for collections of the identified file data from said optical storage device, and data collecting means responsive to said queuing means for asynchronously collecting the identified file data from predetermined data sectors of said optical storage device and storing said predetermined data sectors in said caching space of said third memory device.

13. A caching apparatus as defined in claim 9, wherein said caching engine includes interpreting means responsive to said script generator for interpreting a plurality of predetermined caching instructions which include the generated event script, said interpreting means comprising entire file reading means for reading an entire file responsive to an application reading only a portion of a file, read ahead means for reading ahead a predetermined number of sectors responsive to an application only reading a portion of a file, selective retaining means for selectively retaining sectors of a file, and avoiding means for avoiding at least predetermined portions of a file and not storing them in said caching space.

14. A caching apparatus as defined in claim 13, wherein said interpreting means further comprises data replacing means for replacing data temporarily stored in said caching data storage means with additional data, said data replacing means including most-recently-hit discarding means for discarding data responsive to a recent read of the data.

15. A caching apparatus as defined in claim 9, wherein said optical storage access monitor further comprises logging means monitor for logging optical storage device access data to supply to said script generator, and wherein said optical storage access monitor includes user input means responsive to said first processor for inputting user selected events through said user interface for including in the monitored and analyzed access data and the generated event script generated by said script generator.

16. A caching apparatus as defined in claim 15, wherein said script generator includes user modifying means responsive to said first processor for modifying a generated event script, and wherein said user input means is also positioned in communication with said script generator for inputting predetermined event script parameters from a user for a generated event script.

17. A caching apparatus for enhancing retrieval of data from an optical storage device, the caching apparatus comprising:

a first memory device for storing data therein, said first memory device further having a predetermined application stored therein;

a second memory device positioned in communication with said first memory device for storing data, said second memory device having a predetermined amount of data storage space, the predetermined amount of data storage space including a caching space defined by only a portion of the predetermined amount of data storage space of said second memory device;

a caching engine positioned in communication with said first memory device and said second memory device for temporarily storing data from said data storage sectors in said caching space and thereby providing a quick transfer of the data to said first memory device for use by the predetermined application; and event script providing means positioned in communication with said caching engine for providing an event script that directs the caching engine to transfer data sectors from said optical data storage device to said caching space in advance of being actually needed for said predetermined application of said first memory device.

18. A caching apparatus as defined in claim 17, further comprising network communicating means positioned in communication with at least said first memory device and said optical storage device for communicating between a network of memory devices which at least includes said first memory device and an optical storage device.

19. A caching apparatus as defined in claim 17, further comprising a script generator positioned in communication with said event script providing means for generating the event script, said script generator including file data characterizing means for characterizing file data accessed from an optical storage device and identifying means responsive to said file data characterizing means for identifying the characterized file data.

20. A caching apparatus as defined in claim 19, wherein said caching engine includes event recognizing means responsive to said predetermined application for recognizing an event signaled by said predetermined application, queuing means responsive to said event recognizing means for queuing a collection of identified file data from said optical storage device, and data collecting means responsive to said queuing means for asynchronously collecting the identified file data from predetermined data sectors of said optical storage device.

21. A caching apparatus as defined in claim 20, wherein said caching engine includes interpreting means for interpreting a plurality of predetermined caching instructions which include the event script, said interpreting means comprising entire file reading means for reading an entire file responsive to an application reading only a portion of a file, read ahead means for reading ahead a predetermined number of sectors responsive to an application only reading a portion of a file, selective retaining means for selectively retaining sectors of a file, and avoiding means for avoiding at least predetermined portions of a file and not storing them in the caching space.

22. A caching apparatus as defined in claim 21, wherein said interpreting means further comprises data replacing means for replacing data temporarily stored in the caching space with additional data, said data replacing means including most-recently-hit discarding means for discarding predetermined data responsive to a recent read of the data.

23. A caching apparatus as defined in claim 18, wherein said caching engine includes event recognizing means responsive to said predetermined application for recognizing an event signaled by said predetermined application, queuing means responsive to said event recognizing means for queuing a collection of identified file data from said optical storage device, and data collecting means responsive to said queuing means for asynchronously collecting the identified file data from predetermined data sectors of said optical storage device.

24. A caching apparatus as defined in claim 18, wherein said caching engine includes interpreting means for interpreting a plurality of predetermined caching instructions which include the event script, said interpreting means comprising entire file reading means for reading an entire file responsive to an application reading only a portion of a file, read ahead means for reading ahead a predetermined number of sectors responsive to an application only reading a portion of a file, selective retaining means for selectively retaining sectors of a file, and avoiding means for avoiding at least predetermined portions of a file and not storing them in the caching space.

25. A method of enhancing the retrieval speed of data from an optical storage device, the method comprising:

monitoring data representative of access to an optical storage device for a predetermined application;

analyzing the monitored access data;

generating an event script for a caching engine responsive to the analyzed access data; and instructing the caching engine which sectors to transfer from an optical storage device in advance of being actually needed responsive to the generated event script.

26. A method as defined in claim 25, further comprising compiling event script instructions into a predetermined format that is interpreted by the caching engine to thereby provide guidance for the operation of and enhancing the efficiency of the caching engine.

27. A method as defined in claim 25, wherein the script generating step includes characterizing file data accessed from the optical storage device and identifying the characterized file data.

28. A method as defined in claim 27, wherein the event script includes instructions which the caching engine interprets responsive to predetermined events signaled by the predetermined application, queuing requests for collections of characterized file data from the optical storage device, and asynchronously collecting the characterized file data from predetermined data sectors of the optical storage device.

29. A method as defined in claim 25, further comprising generating a plurality of predetermined caching instructions, the caching instructions generated including reading an entire file responsive to an application reading only a portion of a file, reading ahead a predetermined number of sectors responsive to an application only reading a portion of a file, selectively retaining sectors of a file, and avoiding at least predetermined portions of a file and not storing them in the caching space.

30. A method as defined in claim 29, wherein the predetermined caching instructions further include instructions for replacing predetermined data temporarily stored in the caching space with additional data according to a most-recently-hit policy, and the method further comprising discarding the predetermined data responsive to a recent hit of the data.

31. A method as defined in claim 30, wherein the monitoring step includes logging optical storage device access data prior to generating a script for the caching engine and inputting user selected events through a user interface for including in the monitored and analyzed access data and the generated event script.

32. A method as defined in claim 30, further comprising inputting predetermined event script parameters from a user for a generated event script and modifying a generated event script.

33. A method of enhancing the retrieval speed of data from a storage device, the method comprising:

analyzing a predetermined application program;

generating an event script responsive to the analyzed predetermined application program;

providing a computer system having at least a first data storage device to store data and a second data storage device in communication with the first data storage device to store data; and transferring data from the second data storage device to the first data storage device in advance of actually being needed by the second data storage device responsive to the generated event script.

34. A method as defined in claim 33, wherein the transferring of data is performed by a caching engine.

35. A method as defined in claim 34, further comprising signaling to the caching engine from the application program that predetermined events have occurred, queuing requests for collection of characterized file data from the first storage device, and asynchronously collecting the characterized file data from data sectors of the storage device.

36. A method as defined in claim 34, further comprising interpreting a plurality of predetermined caching instructions, the caching instructions including reading an entire file responsive to an application reading only a portion of a file, reading ahead a predetermined number of sectors responsive to an application only reading a portion of a file, selectively retaining sectors of a file, and avoiding predetermined at least portions of a file and not storing them in the caching space.

37. A method as defined in claim 36, wherein the instructions generated further include replacing data temporarily stored in the caching space with additional data responsive to a predetermined replacement priority, the replacing data step including most-recently-hit discarding of data responsive to the recent reading of the data.

38. A method as defined in claim 33, wherein the generating of an event script is performed by a computer program.

39. A method of enhancing the retrieval speed of data from an optical storage device, the method comprising:

characterizing file data accessed from an optical storage device;

identifying the characterized file data;

signaling an event representative of an event associated with an application program;

queuing a request for a collection of characterized file data from the optical storage device responsive to the signaled event; and asynchronously collecting the characterized file data from data sectors of the optical storage device in advance of actually being needed.

40. A method as defined in claim 39, further comprising generating a plurality of predetermined caching instructions, the caching instructions generated including reading an entire file responsive to an application reading only a portion of a file, reading ahead a predetermined number of sectors responsive to an application reading only a portion of a file, selectively retaining sectors of a file, and avoiding at least predetermined portions of a file and not storing them in the caching space.

41. A method as defined in claim 40, wherein the instructions generated further include replacing data temporarily stored in the caching space with additional data responsive to a predetermined replacement priority, the replacing data step including most-recently-hit discarding of data responsive to a recent reading of the data.

42. A method as defined in claim 41, further comprising inputting predetermined parameters from a user and generating a modified event script responsive to the user inputted parameters.

* * * * *